(12) United States Patent
Coomer et al.

(10) Patent No.: US 12,043,474 B2
(45) Date of Patent: Jul. 23, 2024

(54) CONTAINER

(71) Applicant: FORTINBRAS RESULTS PTY LTD, Bridgeman Downs (AU)

(72) Inventors: Paul Coomer, Bridgeman Downs (AU); Scot Farley, Birkdale (AU)

(73) Assignee: Fortinbras Results Pty Ltd, Bridgeman Downs (AU)

( * ) Notice: Subject to any disclaimer, the term of this patent is extended or adjusted under 35 U.S.C. 154(b) by 228 days.

(21) Appl. No.: 17/687,637

(22) Filed: Mar. 5, 2022

(65) Prior Publication Data
US 2022/0185578 A1    Jun. 16, 2022

Related U.S. Application Data

(63) Continuation-in-part of application No. 16/479,341, filed as application No. PCT/AU2018/050040 on Jan. 23, 2018, now abandoned.

(30) Foreign Application Priority Data

Jan. 24, 2017    (AU) ............................... 2017900213

(51) Int. Cl.
*B65D 88/52*    (2006.01)
*B60P 7/13*    (2006.01)
(Continued)

(52) U.S. Cl.
CPC ............... *B65D 88/52* (2013.01); *B60P 7/13* (2013.01); *B61D 45/007* (2013.01); *B65D 77/06* (2013.01); *B65D 88/54* (2013.01); *B65D 90/205* (2013.01)

(58) Field of Classification Search
CPC ...... B61D 45/00–008; B65D 88/52–58; B65D 88/1675; B65D 88/1681; B65D 5/4208; B65D 25/22
See application file for complete search history.

(56) References Cited

U.S. PATENT DOCUMENTS 3,756,469 A * 9/1973 Clark .................. B65D 90/046
222/105
4,143,796 A * 3/1979 Williamson ....... B65D 88/1681
383/41
(Continued)

FOREIGN PATENT DOCUMENTS

GB    987455    3/1965

OTHER PUBLICATIONS

International Search Report mailed Feb. 27, 2018 for International Application No. PCT/AU2018/050040.
(Continued)

*Primary Examiner* — Nicolas A Arnett
(74) *Attorney, Agent, or Firm* — Lippes Mathias LLP

(57) ABSTRACT

An apparatus for storing or transporting flowable materials or other materials, such as diesel fuel, includes a container and a support. The container is supported by the support. The support sits on or is mounted across an upper part of an open top railway wagon or open top truck or truck trailer used for transporting bulk commodities (such as coal or iron ore). The apparatus is movable between an expanded configuration in which the container is expandable into a lower part of the open top railway wagon or open top truck or truck trailer used for transporting bulk commodities, and a collapsed configuration in which the container is collapsible to the support. In use, a railway wagon is filled with coal or other bulk commodities and the apparatus is placed on top of the railway wagon in the collapsed configuration. At the port, the coal is emptied from the railway wagon and the container of the apparatus is filled with fuel. The support supports the apparatus on the railway wagon and the container extends into the railway wagon. The fuel may then be transported back to the mine, where the apparatus is removed from the railway wagon and the container decanted. The railway wagon is again filled with coal or
(Continued)

other bulk commodities and the apparatus is placed on top of the railway wagon in the collapsed configuration and the cycle continues to meet the fuel requirements of the relevant mine.

15 Claims, 18 Drawing Sheets

(51) Int. Cl.
  *B61D 45/00* (2006.01)
  *B65D 77/06* (2006.01)
  *B65D 88/54* (2006.01)
  *B65D 90/20* (2006.01)

(56) References Cited

U.S. PATENT DOCUMENTS

| | | | | |
|---|---|---|---|---|
| 4,194,652 | A * | 3/1980 | Williamson | B65D 88/1612 112/475.08 |
| 4,397,406 | A * | 8/1983 | Croley | B65D 5/726 222/105 |
| 4,497,259 | A * | 2/1985 | Titterton | B61D 3/06 410/58 |
| 4,688,979 | A * | 8/1987 | Kupersmit | B65D 88/16 414/412 |
| 4,861,215 | A * | 8/1989 | Bonerb | B60P 3/426 414/469 |
| 5,402,732 | A * | 4/1995 | Erickson | B61D 5/02 222/105 |
| 5,622,277 | A * | 4/1997 | Van Giezen | B65D 77/061 220/9.4 |
| 5,897,012 | A * | 4/1999 | Sortwell | B65D 19/12 220/666 |
| 6,079,934 | A * | 6/2000 | Beale | B65D 90/046 383/117 |
| 8,100,614 | B2 * | 1/2012 | Jerich | B60P 3/426 410/2 |
| 2007/0108204 | A1 * | 5/2007 | Warhurst | B65D 90/021 220/6 |
| 2009/0212550 | A1 * | 8/2009 | Albers | B60P 3/426 220/4.12 |
| 2010/0314386 | A1 * | 12/2010 | Buonerba | B65D 90/047 220/666 |
| 2019/0352089 | A1 * | 11/2019 | Coomer | B65D 88/22 |
| 2021/0198032 | A1 * | 7/2021 | Kyte | B65D 88/524 |

OTHER PUBLICATIONS

Written Opinion of the International Searching Authority mailed Feb. 27, 2018 for International Application No. PCT/AU2018/050040.
International Preliminary Report on Patentability mailed Jul. 27, 2018 for International Application No. PCT/AU2018/050040.
Examination Report No. 1 dated Jun. 30, 2022 for Australian Application No. 2022203349.

* cited by examiner

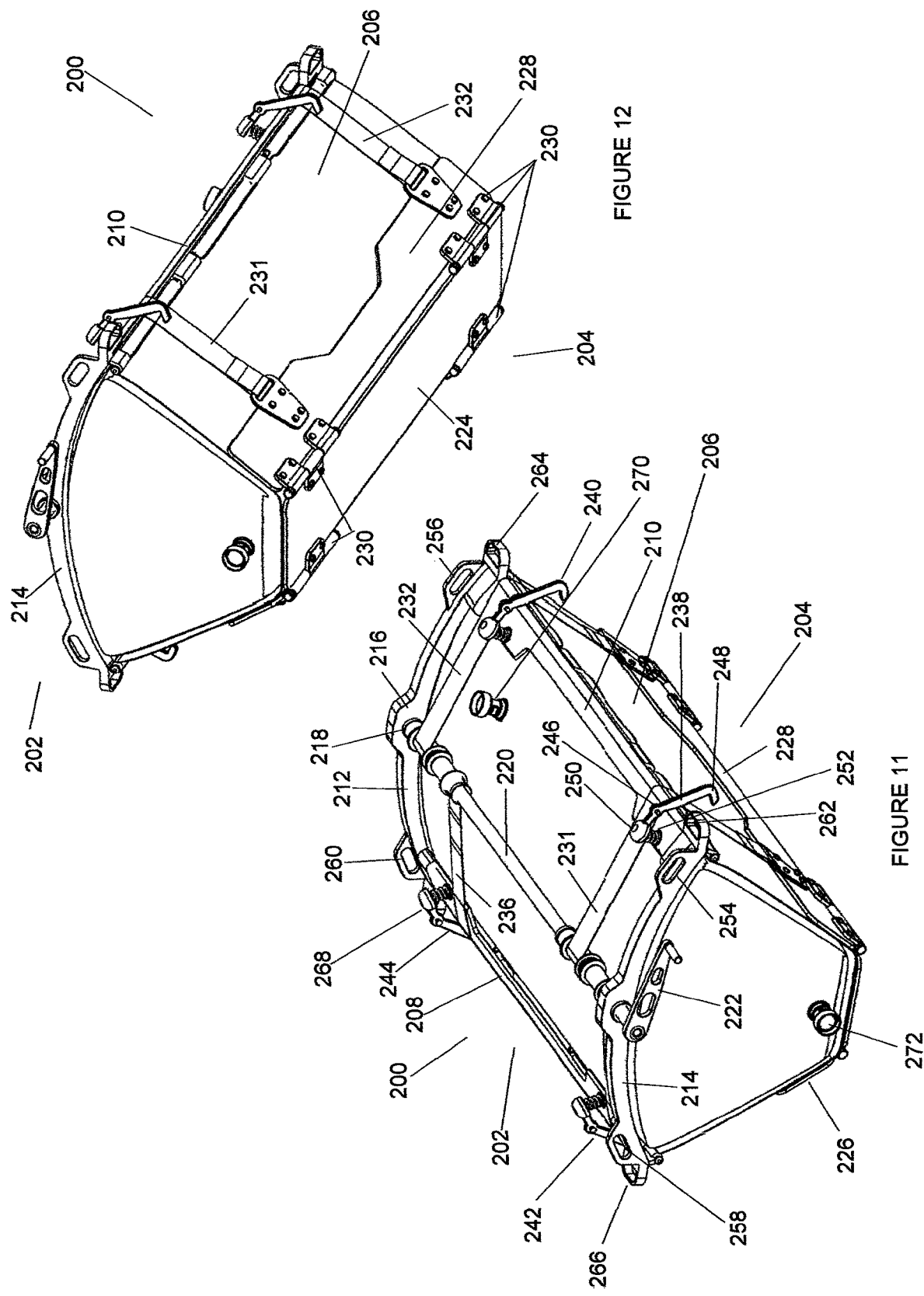

CONTAINER

CROSS-REFERENCE TO RELATED APPLICATIONS

This application is a continuation-in-part of U.S. application Ser. No. 16/479,341 having a 35 U.S.C. 371(c) date of Jul. 19, 2019 and a filing date of Jan. 23, 2018 as being the U.S. National Phase of PCT International Application No. PCT/AU2018/050040 having an international filing date of Jan. 23, 2018 and which claims priority from Australian Application No. 2017900213 filed Jan. 24, 2017. The entire disclosure of each of said prior applications listed above is hereby expressly incorporated by reference into the present specification.

TECHNICAL FIELD

The present invention relates to an apparatus for storing or transporting flowable materials, such as liquids, or other materials. The apparatus includes a container that is expandable and collapsible so that it can adopt an expanded configuration and a collapsed configuration in which the container occupies a smaller volume than when in the expanded configuration.

BACKGROUND ART

Many mining sites are located in remote regions. Consequently, most supplies and commodities that are required to operate the mine need to be freighted into the mine site. For example, large mines use large quantities of fuel, typically diesel fuel. Diesel fuel is brought to the mine site in either dedicated railway fuel wagons or in dedicated fuel trucks. The dedicated railway fuel wagons or dedicated fuel trucks arrive at the mine site filled with fuel. The fuel is then emptied from the railway fuel wagons or fuel trucks into fuel storage tanks at the mine. The empty railway fuel wagons or fuel trucks then leave the mine.

At many mines, the ore, coal or other commodity that is being mined is simply transported away from the mine with little or no additional processing prior to transport. For example, in coal mines in Queensland, the coal is removed from the ground at the mine, placed into open top railway wagons or open top trucks or truck trailers and transported by rail or road to a port for export. To give one example, coal mines located near Moranbah in Queensland will typically transport the mined coal by rail to Hay Point export terminal, which is located on the coast approximately 20 km south of Mackay. This involves a rail journey of approximately 300 km to 400 kms. Once at the export terminal, the railway wagons, trucks or truck trailers are emptied of coal and the empty railway wagons, trucks or truck trailers are returned to the mine.

In the iron ore mines of Western Australia in the Pilbara region, iron ore is mined at mines that are located well away from the coast. The iron ore is normally transported to export ports on the coast by use of railway transport. Again, open top railway wagons are filled with iron ore at the mine and the railway wagons are moved by rail to the export ports on the coast. The railway wagons are emptied at the export port and the empty railway wagons are then returned by rail transport to the mines.

If rail transport is used to supply fuel to the mines, the capacity of the railway line to carry the mined commodity is reduced due to the requirement to provide scheduled travel time for the trains carrying fuel. Consequently, the fuel trains utilise freight capacity on the railway line that could otherwise be used by trains carrying mined product. In some instances, fuel railway wagons are attached to mined product railway wagons but this is not preferred as it in effect reduces the capacity of the train to haul mined product to the port. Train and mine operators seek to haul the maximum railway wagons with mined product to the port to maximise revenues.

If road transport is used to transport fuel to mines, the trucks used to transport the fuel to the mines return from the mines empty. Thus, the trucks are only carrying a load for half of their round trip, which increases the costs of transporting fuel to the mine. The same would apply to fuel railway wagons used to transport fuel to the mines.

The present invention is seeking to address, or at least ameliorate, one or more of the above issues. A number of other liquid products may also be required to be transported to the mine and the present invention may also be relevant to transporting other liquids besides fuel. The present invention may also be relevant for transporting particulate materials, solid materials or non-liquid materials such as magnetite which is used in the coal washing process before the coal is transported to the export terminal. Other materials may also be transported by the present invention.

It be clearly understood that, if a prior art publication is referred to herein, this reference does not constitute an admission that the publication forms part of the common general knowledge in the art in Australia or in any other country.

SUMMARY OF INVENTION

The present invention is directed to an apparatus for storing or transporting flowable materials and to a method for transporting flowable materials, which may at least partially overcome at least one of the abovementioned disadvantages or provide the consumer with a useful or commercial choice.

With the foregoing in view, the present invention in one form, resides broadly in an apparatus for storing or transporting flowable materials or other materials, the apparatus comprising a container and a support, the container being supported by the support, the support adapted to sit on or be mounted across an upper part of an open top railway wagon or open top truck or truck trailer used for transporting bulk commodities, wherein the apparatus is movable between an expanded configuration in which the container is expandable into a lower part of the open top railway wagon or open top truck or truck trailer used for transporting bulk commodities, and a collapsed configuration in which the container is collapsible to the support.

The bulk commodities may be mined product.

In one embodiment, the weight of the support and container is borne by the upper part of the railway wagon or truck or truck trailer when the container is in the collapsed configuration and the apparatus is positioned on a railway wagon or truck or truck trailer.

In one embodiment, the apparatus is removably positioned on the railway wagon or truck or truck trailer.

In one embodiment, the support is located above commodities that are being transported in the railway wagon or truck or truck trailer and the container is in the collapsed configuration when the railway wagon or truck or truck trailer is filled with commodities. The apparatus may sit above or on the commodities that are being transported in the railway wagon or truck or truck trailer.

When the railway wagon or truck or truck trailer is empty (that is, not filled with bulk commodities), the container can be filled with flowable material and moved to the expanded configuration. In this configuration, the container extends deeper into the railway wagon or truck or truck trailer.

In one embodiment, the flowable material is a liquid. In one embodiment, the liquid is a fuel, such as diesel fuel.

In one embodiment, the flowable material is a particulate material.

In one embodiment, the container comprises a bladder type container that expands when filled and can be collapsed when being emptied or is empty.

The container may comprise a self-bunded or double skinned container. The container should meet all requisite standards, such as Australian standards in Australia. The bladder may have an outer skin made from a tough material, such as Kevlar. This can increase the strength of the bladder and reduce the risk of tearing or abrasion.

The container may have one or more openings to allow the container to be filled with flowable material, such as a liquid, and emptied. The one or more openings may be provided with closures or with sealing means. The one or more openings maybe provided with a valve to enable the openings to be opened and closed.

In some embodiments, the container is connected to the support. The container may be removably connected to the support. In other embodiments, the container is supported by the support.

In one embodiment, the container is connected to the support by one or more slings. In other embodiments, the container is bonded to the support. In one embodiment, the container is bonded to the support by use of a suitable adhesive, such as an industrial strength adhesive. In other embodiments, the container may have one or more sleeves that extend over one or more frame members to thereby connect the container to a frame of the support. In one embodiment, the sleeves may comprise sleeves that can be opened and closed.

In some embodiments, the apparatus may comprise one or more containers. In some embodiments, the apparatus comprises a plurality of containers being associated with each support.

In one embodiment, the support comprises a frame. In one embodiment, the frame is adapted to rest on or sit on an upper part of the railway wagon or truck or truck trailer. The frame may rest on the upper edges of the railway wagon or truck or truck trailer. The frame may have one or more cross members that extend across the top of the railway wagon or truck or truck trailer. Some or all of the cross members may rest on the top of the railway wagon or truck or truck trailer. Some or all of the cross members may rest on the upper edges of the railway wagon or truck or truck trailer.

The support may be provided with one or more downwardly extending projections or members. The downwardly extending projections or members are useful in locating the support in or on the top of the railway wagon or truck or truck trailer and also act to minimise lateral movement. If any lateral movement of the apparatus occurs, one or more of the downwardly extending members may come into contact with the sides of the railway wagon or truck or truck trailer (if such contact has not already occurred as part of the apparatus extending into the railway wagon or truck or truck trailer), thereby acting as a stop member to prevent further lateral movement. In some embodiments, the one or more downwardly extending projections or members extend downwardly from the one or more cross members. In some embodiments, the one or more downwardly extending projections or members extend downwardly from ends of the one or more cross members.

The frame may also have one or more longitudinally extending members. The frame is desirably a rectangular frame, but it could also be a square frame.

In another embodiment, the support comprises a support member or a support plate.

In one embodiment, the apparatus comprises an upper support and a lower support. The upper support may comprise an upper support member or an upper support plate or an upper support frame. The upper support is adapted to sit on or be mounted across an upper part of an open top railway wagon or open top truck or truck trailer. The lower support may comprise a lower support member or a lower support plate or a lower support frame. The lower support may be located beneath the container.

In one embodiment, the upper support is connected to the lower support. The upper support may be connected to the lower support by one or more movable members. The movable members may comprise one or more scissor linkages, one or more telescoping members, one or more hydraulic cylinders, or one or more pneumatic cylinders or the like. In other embodiments, the upper support may be connected to the lower support by one or more cables, ropes, wires, bands, straps, elastomeric bands, springs, chains or the like.

In one embodiment, a biasing means or driving means may assist driving the lower support towards the upper support. The biasing means may comprise, for example, springs. The driving means may comprise, for example, hydraulic cylinders, pneumatic cylinders, pulleys that can be rotated to cause chains, cables or the like to be wound up to bring the lower support towards the upper support.

In some embodiments, when the apparatus is in the collapsed configuration, the lower support may be held in position relative to the upper support. For example, holding means may be used to hold the lower support in position relative to the upper support. The holding means may comprise catches, clips, clasps, or cables and wires that are to be wound up onto pulleys or the like.

The apparatus may also comprise one or more lifting points to enable the apparatus to be lifted off the railway wagon or truck or truck trailer and lifted onto or into the railway wagon or truck or truck trailer. The one or more lifting points may comprise one or more crane eyes for receiving crane hooks or one or more openings for receiving tines of a forklift. The apparatus may be lifted substantially vertically in order to clear the apparatus from the railway wagon or truck or truck trailer. The apparatus may then be moved laterally or horizontally once the apparatus is clear of the railway wagon or truck or truck trailer.

In one embodiment, the container has a depth that is similar to a depth of the railway wagon or truck or truck trailer when the container is in the expanded configuration.

In a second aspect, the present invention provides an apparatus for storing or transporting flowable materials or other materials, the apparatus comprising a container, an upper support and a lower support, the upper support adapted to sit on or be mounted across an upper part of an open top railway wagon or open top truck or truck trailer used for transporting bulk commodities, the upper support comprising an upper support plate or an upper support frame, the lower support comprising a lower support plate or a lower support frame or a lower support platform, the lower support having a smaller width than a width of the upper support, a plurality of movable members extending between the upper support and the lower support and connecting the upper support to the lower support, wherein the apparatus is movable between an expanded configuration in which the container is expandable into a lower part of the open top railway wagon or open top truck or truck trailer used for transporting bulk commodities, and a collapsed configuration in which the container is collapsible to the support, wherein the weight of the support and container is borne by the upper part of the railway wagon or truck or truck trailer when the container is in the collapsed configuration and the apparatus is positioned on an empty railway wagon or truck or truck trailer.

By virtue of the lower support having a width that is smaller than the width of the upper support, the lower support can extend into the railway wagon or truck or truck trailer when the apparatus is in the expanded configuration.

As the upper support and the lower support are connected to each other, lifting the upper support off the railway wagon or truck or truck trailer also lifts the container and the lower support off and out of the railway wagon or truck or truck trailer.

In one embodiment, the lower support comprises a central member or a central plate, a first member or first plate hingedly connected to a first side of the central member or central plate and a second member or second plate hingedly connected to a second side of the central member or central plate. In this arrangement, the apparatus can better fit into the railway wagon or truck or truck trailer and the apparatus is usable with a wider variety of railway wagons or trucks or truck trailers. It will be appreciated that as the lower support is lowered into the railway wagon or truck or truck trailer, if the first member or first plate and second member or second plate come into contact with the sides of the railway wagon or truck or truck trailer, the first member or first plate and the second member or second plate can hinge upwardly relative to the central member or central plate. Desirably, when the apparatus is properly positioned on the railway wagon or truck or truck trailer, the central member or central plate rests on the floor of the railway wagon or truck or truck trailer and the first member or first plate and second member or second plate either rest on the floor or rest on the respective sides of the railway wagon or truck or truck trailer. Alternatively, the railway wagon may be provided with reinforcing means and the side members or side plates of the lower support may come into contact with and be supported by the reinforcing means, which, in turn, is supported by the floor of the railway wagon.

Embodiments of the present invention result in the filled apparatus being placed on and in a railway wagon or truck or truck trailer and most of the weight of the filled container and its contents being borne by the sides and/or floor of the railway wagon or truck or truck trailer. When the container has been emptied and the apparatus is in its collapsed configuration, the weight of the apparatus is born by the upper part of the railway wagon or truck or truck trailer, or, if the railway wagon or truck or truck trailer is filled with a commodity, such as coal or minerals, the apparatus rests on the load of the commodity in the railway wagon or truck or truck trailer as well as the upper part of the railway wagon or truck or truck trailer.

In one embodiment of this aspect of the present invention, the plurality of movable members comprise a plurality of straps, or a plurality of cables, or a plurality of chains, or a plurality of wires. In another embodiment, the outer skin of the container or bladder may form the movable member(s), such as by the outer skin of the container or bladder being attached to the lower support.

In embodiments where the lower support comprises a central member or central plate, a first member or first plate hingedly connected to a first side of the central member or central plate and a second member or second plate hingedly connected to a second side of the central member or central plate, the plurality of movable members may have a maximum length that is sufficiently short to cause the first member or first plate and second member or second plate to hinge upwardly when the apparatus is in the fully expanded configuration. In this manner, the first member or first plate and second member or second plate of the lower support will extend upwardly and outwardly relative to the central member or central plate of the lower support when the apparatus is in the fully expanded configuration and the sides of the container are at least partly supported by the first member or first plate and the second member or second plate and the portions of the movable members that extend along the sides of the container, when in the expanded configuration.

In one embodiment, a sheet of flexible material extends between a first side of the upper support and a first side of the lower support and a sheet of flexible material extends between a second side of the upper support and a second side of the lower support. The sheets of material also connect the upper support to the lower support. The sheets of material suitably comprise sheets of flexible material. The sheets of material may comprise a tough fabric.

In embodiments where the lower support comprises a central member or central plate, a first member or first plate hingedly connected to a first side of the central member or central plate and a second member or second plate hingedly connected to a second side of the central member or central plate, the sheets of material may have a length in the direction between the upper support and the lower support that is less than the depth of the container when the container is in the expanded configuration. In this embodiment, as the apparatus is moved towards the expanded configuration, the sheets of material will reach their full length before the container is fully lowered. Further lowering of the container will result in the first member or first plate and the second member or second plate of the lower support hinging upwardly relative to the central member or central plate of the lower support as the lower central member or central plate continues to be lowered to the fully expanded position. It will be appreciated that the sides of the container are somewhat supported by the first and second members or plates of the lower support, the sheets of material and the portions of the movable members that extend over the size of the container and this embodiment.

In one embodiment, the upper support comprises an upper frame having longitudinal members connected by cross-members. The upper frame may also comprise a rotatable shaft. The plurality of straps, cables, chains or wires may each be mounted at one end to the rotatable shaft and mounted at another end to the lower support. By rotating the rotatable shaft, the plurality of straps, cables, chains or wires may roll up on the rotatable shaft, which draws the lower support towards the upper support. In order to move the apparatus to the expanded configuration, the rotatable shaft may be rotated in an opposite direction to extend the plurality of straps, cables, chains or wires and allow the lower support to move away from the upper support.

The rotatable shaft may be provided with a handle or drive motor to enable the rotatable shaft to be rotated. Alternatively, the rotatable shaft may engage with a drive shaft of a drive motor to cause the rotatable shaft to rotate.

In one embodiment, the upper support comprises a first longitudinal side member, a second longitudinal side member, a first crossmember extending between and connecting the first longitudinal side member to the second longitudinal side member, a second crossmember extending between and connecting the first longitudinal side member to the second longitudinal side member, and a rotatable shaft extending between and rotatably mounted to the first crossmember and the second crossmember. The rotatable shaft may be mounted in bearings mounted in the first crossmember and the second crossmember.

In one embodiment, the first crossmember and the second crossmember have a central region that is higher than the end regions thereof and the rotatable shaft is mounted to the central region of the first crossmember and the second crossmember.

The upper support may also comprise one or more lifting points to enable a lifting apparatus, such as a crane, gantry or forklift, to be connected to the upper support and enable the apparatus to be lifted and lowered.

In one embodiment, the upper support comprises one or more clamps that engage with the railway wagon or truck or truck trailer when the apparatus is positioned on the railway wagon or truck or truck trailer. The one or more clamps may be biased downwardly. The one or more clamps may be arranged such that when a lifting apparatus is used to lift or lower the apparatus, the lifting apparatus moves the one or more clamps to a disengaged position and when the apparatus is positioned on the railway wagon or truck or truck trailer and the lifting apparatus removed from the apparatus, the one or more clamps move to an engaged position. The one or more clamps may extend over the outer side walls of the railway wagon or truck or truck trailer and may have a clamping region or hooked region that is positioned under an edge of the sidewall of the railway wagon or truck or truck trailer when the apparatus is positioned on the railway wagon or truck or truck trailer.

In one embodiment, the apparatus may be positioned on a stand when the apparatus is removed from the railway wagon or truck or truck trailer. The stand can support the apparatus whilst it is in the expanded position and the container is filled with material. The container may be emptied whilst the apparatus is supported on the stand and the apparatus moved to the collapsed configuration whilst on the stand. The apparatus may then be removed from the stand when it is in the collapsed configuration. In embodiments where the upper frame of the apparatus is provided with one or more clamps, the clamps may also clamp onto the stand when the apparatus is positioned on the stand.

The upper support may be provided with a plurality of eyes or eyelets or a plurality of ears for receiving associated projections on the stand to thereby position and support the apparatus on the stand.

In one embodiment, in use of the apparatus of the present invention with a train that is used to transport bulk commodities from a mine to a port or other location, the railway wagon is filled with bulk commodities and the bulk commodities (such as mined products) are emptied at the port or other location. An apparatus in accordance with the present invention is placed on the top of a railway wagon such that the support rests on the upper part of the railway wagon or is mounted to the railway wagon. The container of the apparatus may have been pre-filled with liquid fuel, such as diesel fuel or the container may be filled with liquid fuel once the apparatus has been positioned on the railway wagon. When the container has been filled with liquid fuel, the container is in its expanded configuration and the container fills or at least partially fills the volume of the railway wagon. The train will have a number of railway wagons and some or all of the railway wagons may have apparatus in accordance with the present invention placed on them. The number of containers that are carried by the train may depend upon the amount of fuel required to be transported to the mine or the hauling capacity of the train.

The train then travels back to the mine and transports the fuel carried in the containers to the mine. When the train arrives at the mine, each of the apparatus that has been loaded onto the train are removed from the railway wagons and the fuel emptied from the containers into fuel storage tanks at the mine. Alternatively, the apparatus may comprise mobile fuel storage containers and the apparatus with filled containers may be removed from the train at the mine site and used as fuel storage containers at the mine site. In some embodiments, the apparatus could be modular or be able to be stored on top of each other or adjacent to each other. Using the apparatus as mobile storage containers may negate the need for dedicated fuel storage tanks at the mine. It will be appreciated that in this embodiment the apparatus may be moved to any desired or required location at the mine.

Once the apparatus of the present invention has been removed from the railway wagons, the railway wagons can be filled with the bulk commodity (such as ore or coal) that is mined at the mine. The apparatus of the present invention, with the container now in the collapsed configuration, can then be positioned back onto the railway wagons such that the container is positioned on or above the commodities being carried in the railway wagon. As the container is in the collapsed configuration at this stage, the apparatus has a relatively low height and can still be carried by the railway wagon even though the railway wagon has been filled or partly filled with bulk commodities.

The train then travels back to the port or other location. Depending on how the bulk commodities are emptied from the railway wagons, the apparatus of the present invention may either be removed from the railway wagons, such as by lifting off the railway wagons using a gantry, crane or a forklift, and the railway wagons emptied of bulk commodities, or the railway wagons may simply be emptied with the apparatus of the present invention still in place (this option is feasible if the bulk commodities are emptied via the bottom of the railway wagons, for example). Once the bulk commodities have been emptied from the railway wagons, the apparatus of the present invention may be put back in place on the railway wagons either filled or to be filled with liquid fuel for transport back to the mine. It is apparent that if the apparatus of the present invention can remain on the railway wagons during emptying of bulk commodities, the step of placing the apparatus back onto the railway wagons will not be required. The containers, which are now again filled with fuel, can then be transported by the train back to the mine and the cycle can continue.

It will be appreciated that the apparatus of the present invention may also be used in a similar manner in respect of trucks and truck trailers that are used to transport bulk commodities from the mine to a port or other location.

In a further embodiment, the apparatus, when filled with fuel, is transported to the mine in or on empty railway wagons or trucks or truck trailers that are used to transport bulk commodities from the mine to another location. The empty apparatus may then be transported back to another other location on other trucks or truck trailers or other trains that are used to transport other items to the mine and that would otherwise be returning from the mine empty. In this embodiment, a plurality of apparatus in accordance with the present invention may be stacked on top of each other for ease of transport and minimisation of transport costs.

In a further aspect, the present invention provides a method for transporting flowable material, such as liquids, from one location to another location comprising the steps of providing an apparatus in accordance with the present invention, placing the apparatus in or on an open top railway wagon or an open top truck or truck trailer, filling the container with liquid, transporting the railway wagon or truck or truck trailer to the other location, removing the apparatus from the railway wagon or truck or truck trailer and emptying the liquid from the container or using the apparatus as a mobile storage container. The steps of filling the container and emptying the container make take place with the apparatus either in or on the railway wagon or truck or truck trailer or off the railway wagon or truck or truck trailer.

In one embodiment, the method may further comprise filling the railway wagon or truck or truck trailer with bulk commodities and placing the apparatus in or on the railway wagon or truck or truck trailer such that the container is in the collapsed configuration and the container sits on or above the bulk commodities, and transporting the railway wagon or truck or truck trailer to the one location.

In another embodiment, once the container has been emptied, a plurality of the apparatus are placed on a truck or truck trailer or on a train such that the plurality of apparatus forms a stack and the stack is transported to another location.

In another aspect, the present invention provides, in combination, an open top railway wagon or open top truck or truck trailer and an apparatus as described herein, the apparatus being positioned on the railway wagon or truck or truck trailer such that the support sits on or is mounted across an upper part of an open top railway wagon or open top truck or truck trailer.

In one embodiment, the upper part of the open top railway wagon or open top truck or truck trailer bears the weight of the apparatus when the container is in the expanded or collapsed configuration. In one embodiment, at least some of the upper edges of the open top railway wagon or open top truck or truck trailer bear the weight of the apparatus when the container is in the expanded or collapsed configuration.

In one embodiment, the apparatus is removably positioned on the railway wagon or truck or truck trailer.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which:

In FIG. 1, the containers are in an expanded configuration;

In FIG. 4, the container has been omitted for clarity;

In FIG. 6, the container has been omitted for clarity;

FIG. 11 shows a perspective view from above of an apparatus in accordance with another embodiment of the present invention, with the apparatus being in the expanded configuration;

FIG. 12 shows a perspective view from below of the apparatus shown in FIG. 11;

DESCRIPTION OF EMBODIMENTS

It will be appreciated that the drawings have been provided for the purposes of illustrating preferred embodiments of the present invention. Therefore, it will be understood that the present invention should not be considered to be limited solely to the features as shown in the attached drawings.

Figure 1:
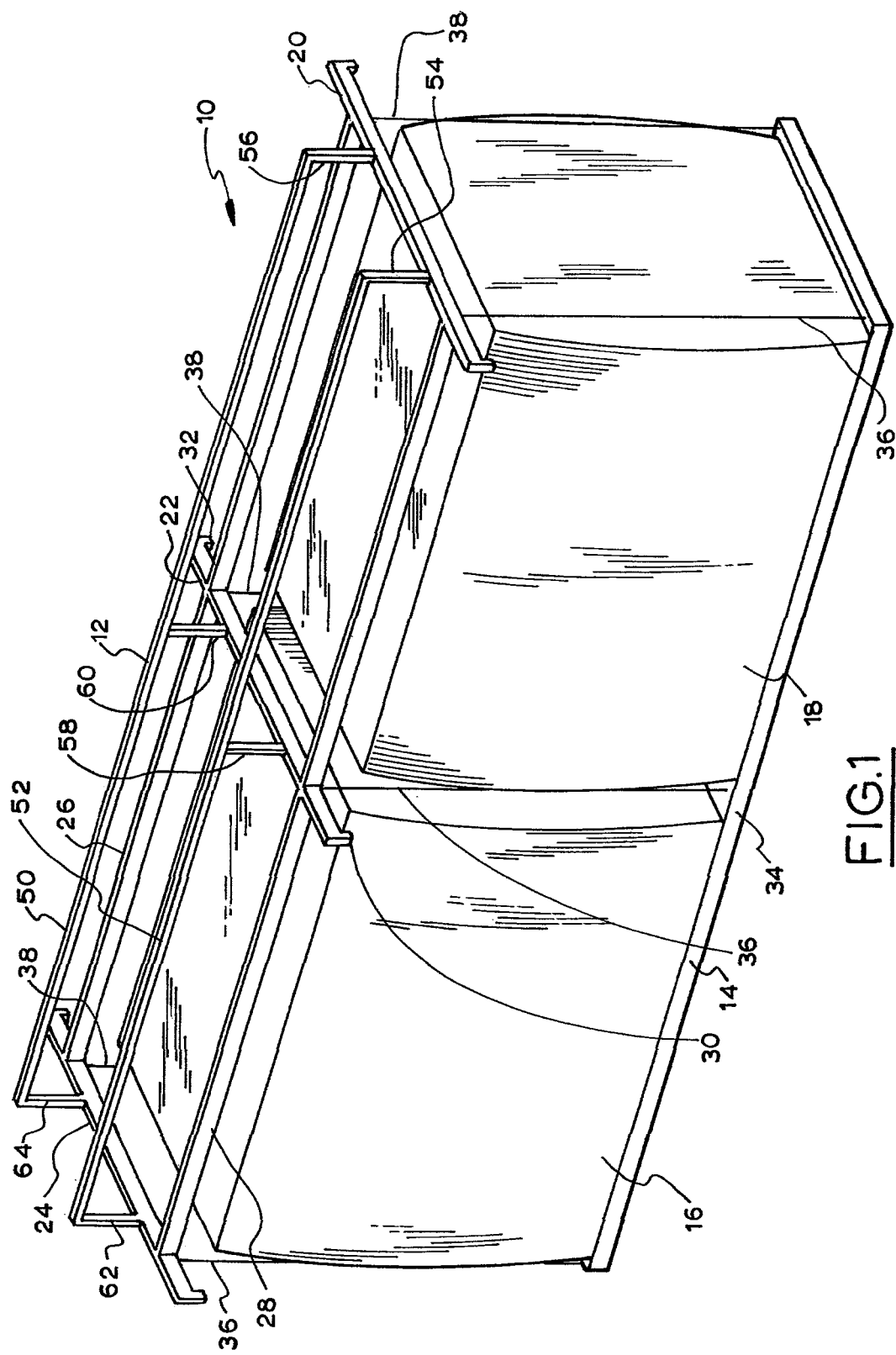
FIG. 1 shows a perspective view of an apparatus in accordance with one embodiment of the present invention.

FIG. 1 shows a perspective view of an apparatus in accordance with the present invention. In FIG. 1, the apparatus is shown in the expanded configuration with the containers being filled with fuel. The apparatus 10 shown in FIG. 1 includes an upper support 12 and a lower support 14. Two fuel containers 16, 18 are included. The fuel containers 16, 18 may be provided with standard fitments for filling and emptying with fuel. These are conventional in design and are not shown in the drawings. The fuel containers 16, 18 are of a bladder-like construction.

The upper support 12 comprises a frame having cross members 20, 22, 24 that are joined to longitudinal members 26, 28. The upper frame is in the form of rectangular frame. The cross members may be joined to the longitudinal members by welding. As can be seen from FIG. 1, the cross members 20, 22, 24 extend laterally beyond the longitudinal members 26, 28. Each cross member includes a downwardly extending projection or member at its respective ends. For example, cross member 22 has downwardly extending members 30, 32 located at its respective ends. Cross members 20 and 24 have similar downwardly extending members.

The lower support 14 may be in the form of a base plate 34. The base plate 34 may have a reinforcing frame (not shown) located underneath it. The lower frame 14 is connected to the upper frame 12 by a plurality of cables or chains, some of which are numbered at 36 and 38. The cables or chains 36, 38 are suitably of essentially identical length. The length of the cables or chains 36, 38 sets the maximum distance at which the lower support 14 can be spaced from the upper support 12 when the apparatus 10 is in the expanded configuration.

Figure 2:
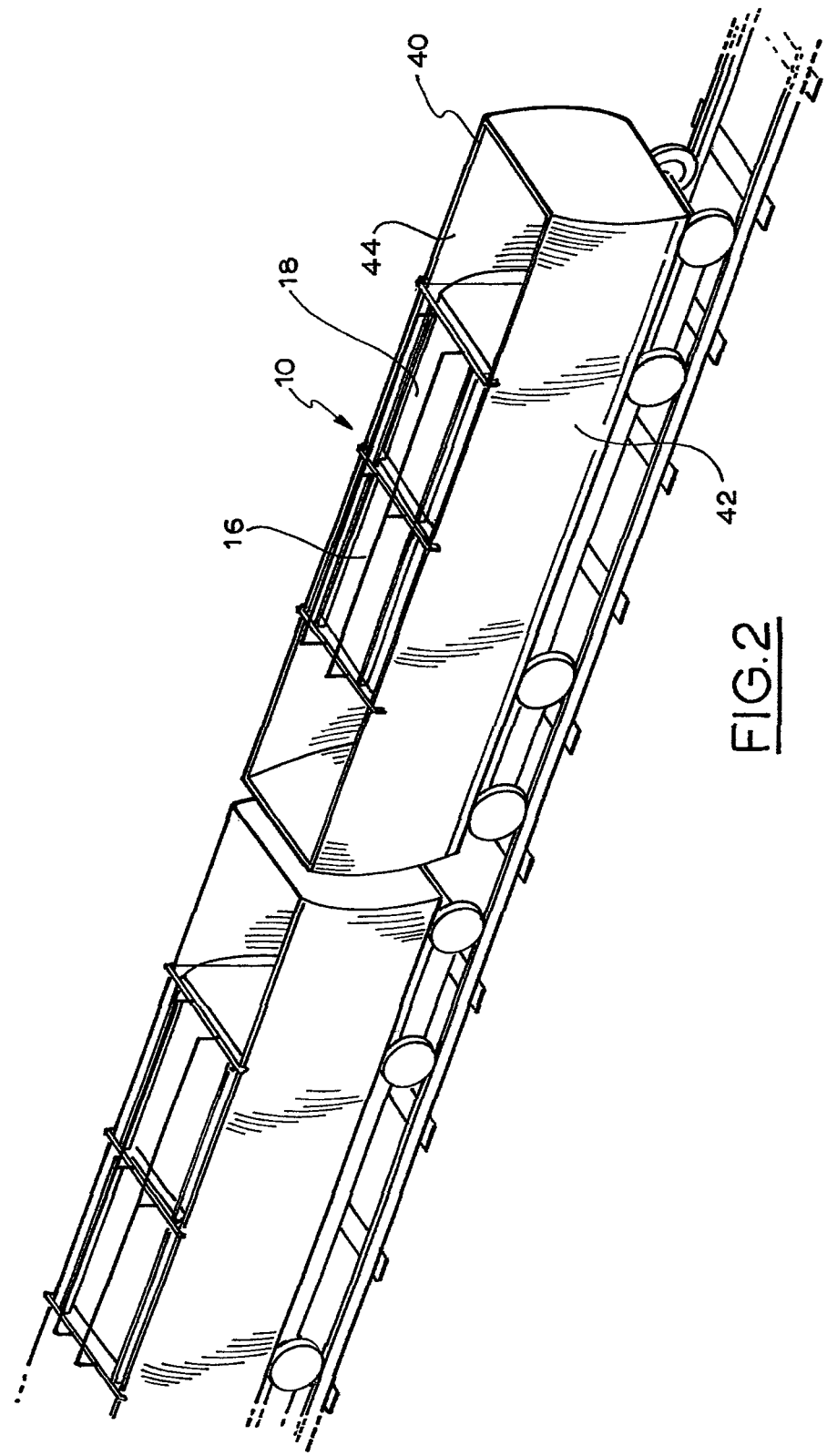
FIG. 2 shows a perspective view of apparatus in accordance with one embodiment of the present invention located in a railway wagon.

FIG. 2 shows the apparatus 10 shown in FIG. 1 located in a railway wagon 40. Railway wagon 40 is an open top railway wagon that is used for transporting bulk commodities, such as iron ore or coal from a mine to a port or other location. The railway wagon 40 has opposed sides 42, 44. The railway wagon 40 is of conventional construction and need not be described further.

In use of the apparatus 10, the apparatus is lifted by a lifting gantry, a crane or a forklift and lowered onto the top of the sides 42, 44 of the railway wagon 40. The cross members 20, 22, 24 rest on the top of the sides 42, 44. The downwardly extending members 30, 32 extend over and along the respective sides 42, 44 of the railway wagon 40. This assists in positioning the apparatus 10 in the correct location. The downwardly extending members 30, 32 also assist in minimising lateral movement of the apparatus 10. It will be understood that if the apparatus 10 moves laterally relative to the railway wagon 40, the downwardly extending projections 30 or 32 will come into contact with the respective side of the railway wagon, thereby preventing further lateral movement of the apparatus 10.

As shown in FIG. 2, the fuel containers 16, 18 are filled with fuel and are therefore in the expanded configuration. As can be seen, the containers 16, 18 extend into the volume defined by the open topped railway wagon 40. Desirably, the lower support 14 of apparatus 10 rests on the floor of the railway wagon 40. However, it will be understood that the lower support 14 may be located a distance above the floor of the railway wagon 40 and may rest on the rounded sides of the railway wagon 40.

Although the embodiment shown in FIGS. 1 and 2 utilise a construction that includes two separate containers, it will be appreciated that a single container may be used. The use of smaller containers that is necessarily involved in having more than one container associated with each support may be beneficial in that surging of the liquid within the container will be lessened if smaller containers are used. The containers may also be provided with internal baffles (not shown) to minimise movement of liquid within the filled containers.

Figure 3:
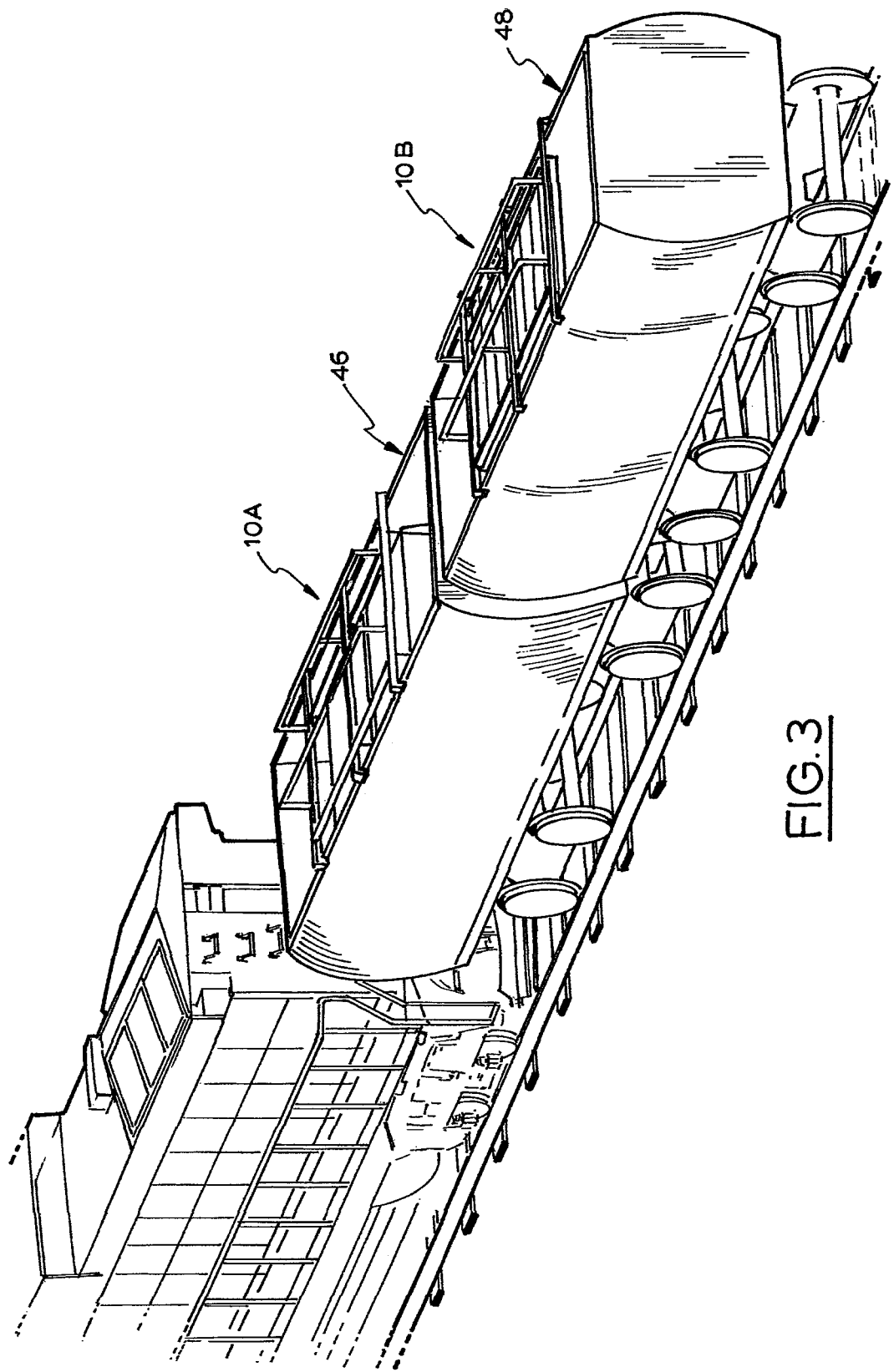
FIG. 3 shows a perspective view of apparatus in accordance with one embodiment of the present invention being located in railway wagons, with one railway wagon having the apparatus shown in an expanded configuration and another railway wagon shown the apparatus in the collapsed configuration.

FIG. 3 shows a railway wagon 46 that has an apparatus 10A that is in the expanded condition with the containers being filled with fuel. FIG. 3 also shows a second railway wagon 48 that has an apparatus 10B which has containers that are empty and the apparatus is in the collapse configuration. Railway wagon 48 shows a view of the apparatus being used in its collapse configuration when the railway wagon 48 may be filled with bulk commodities, such as iron ore or coal and the empty containers of apparatus 10B are collapsed and the apparatus 10B is being transported from the mine to a port or other location where the containers may be subsequently filled with fuel.

Returning now to FIG. 1, the upper support 12 further includes raised longitudinal members 50, 52 that are connected to the cross members 20, 22, 24 by downwardly extending members 54, 56, 58, 60, 62, 64. The raised longitudinal members 50, 52 are spaced above the respective cross members 20, 22, 24 by a distance that is at least sufficient to enable the tines of a forklift to be placed underneath the raised longitudinal members 50, 52. This enables the forklift to raise and lower the apparatus 10. In this manner, a forklift may be used to lift the apparatus 10 off the railway wagon and to place the apparatus 10 back in or on the railway wagon. Alternatively, lifting gantries or lifting cranes may be used to raise and lower the apparatus 10.

Figure 4:
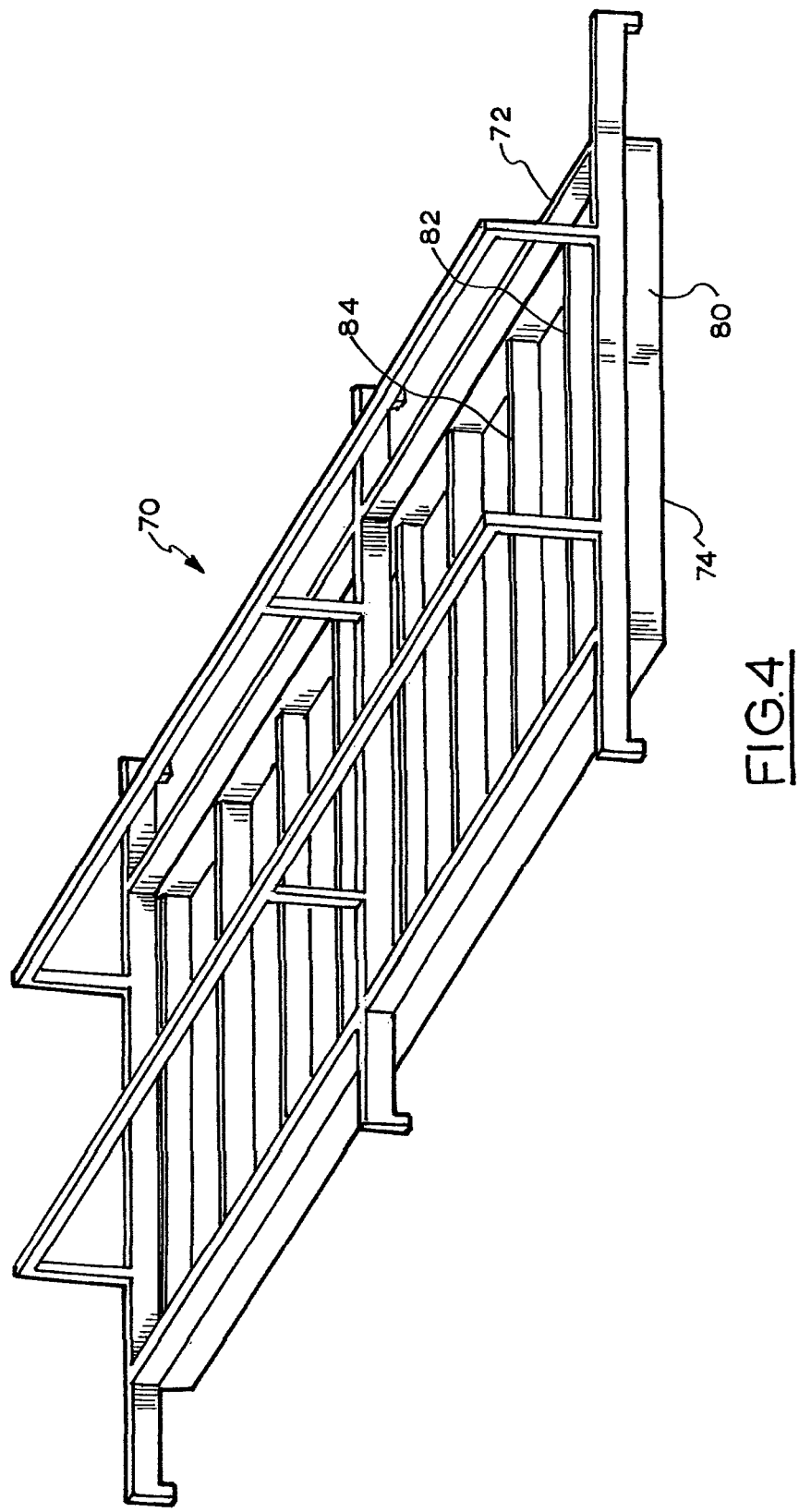
FIG. 4 shows a perspective view of an apparatus in accordance with one embodiment of the present invention in the collapsed configuration.
Figure 5:
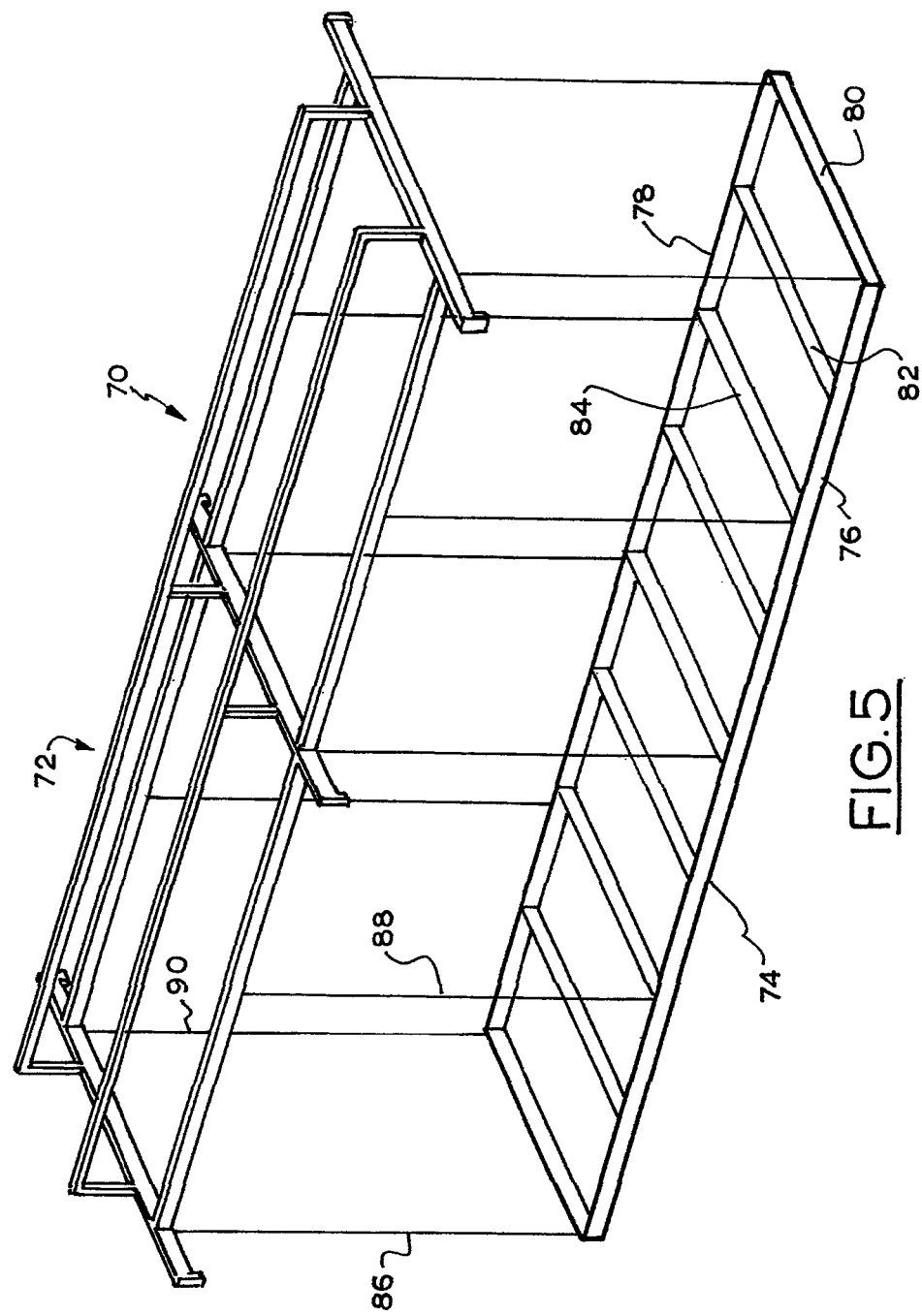
FIG. 5 shows a perspective view of the apparatus shown in FIG. 4 in the expanded configuration. Again, the container has been omitted for clarity.

FIGS. 4 and 5 show another embodiment of the present invention. In FIGS. 4 and 5, the containers have been omitted for clarity. FIG. 4 shows the apparatus 70 in the collapsed configuration and FIG. 5 shows the apparatus 70 in the expanded configuration. Apparatus 70 includes an upper support 72 and a lower support 74. Upper support 72 is identical to the upper support 12 shown in FIG. 1 and need not be described further. Lower support 74 comprises a lower support frame that has longitudinal members 76, 78 and a plurality of cross members, some of which are numbered at 80, 82, 84, that are joined to the longitudinal members, such as by welding. Cables or chains, some of which are numbered at 86, 88, 90, connect the upper support 72 to the lower support 74. As can be best seen in FIG. 4, the frame of the lower support 74 is of generally similar size to the frame of the upper support 72, except that the frame of the lower support 74 does not have cross members that project laterally past the longitudinal members 76, 78. The frame of the lower support 74 is suitably sized such that it has a similar or slightly smaller width dimension than the width of the railway wagon or truck or truck trailer into which it moves when in the expanded configuration.

Although not shown in FIGS. 4 and 5, the upper support and/or the lower support may also be provided with holding means to hold the lower support in position relative to the upper support when the apparatus 70 is in the collapsed configuration. For example, the upper support and/or the lower support may be provided with one or more clasps, clips or catches that engage when the upper support and lower support are brought together in the collapsed configuration to thereby hold the upper support relative to the lower support. Alternatively, the cables or chains 86, 88, 90 may be wound up on pulleys (not shown) and the pulleys may be locked when the cables or chains are fully wound up on the pulleys.

Figure 6:
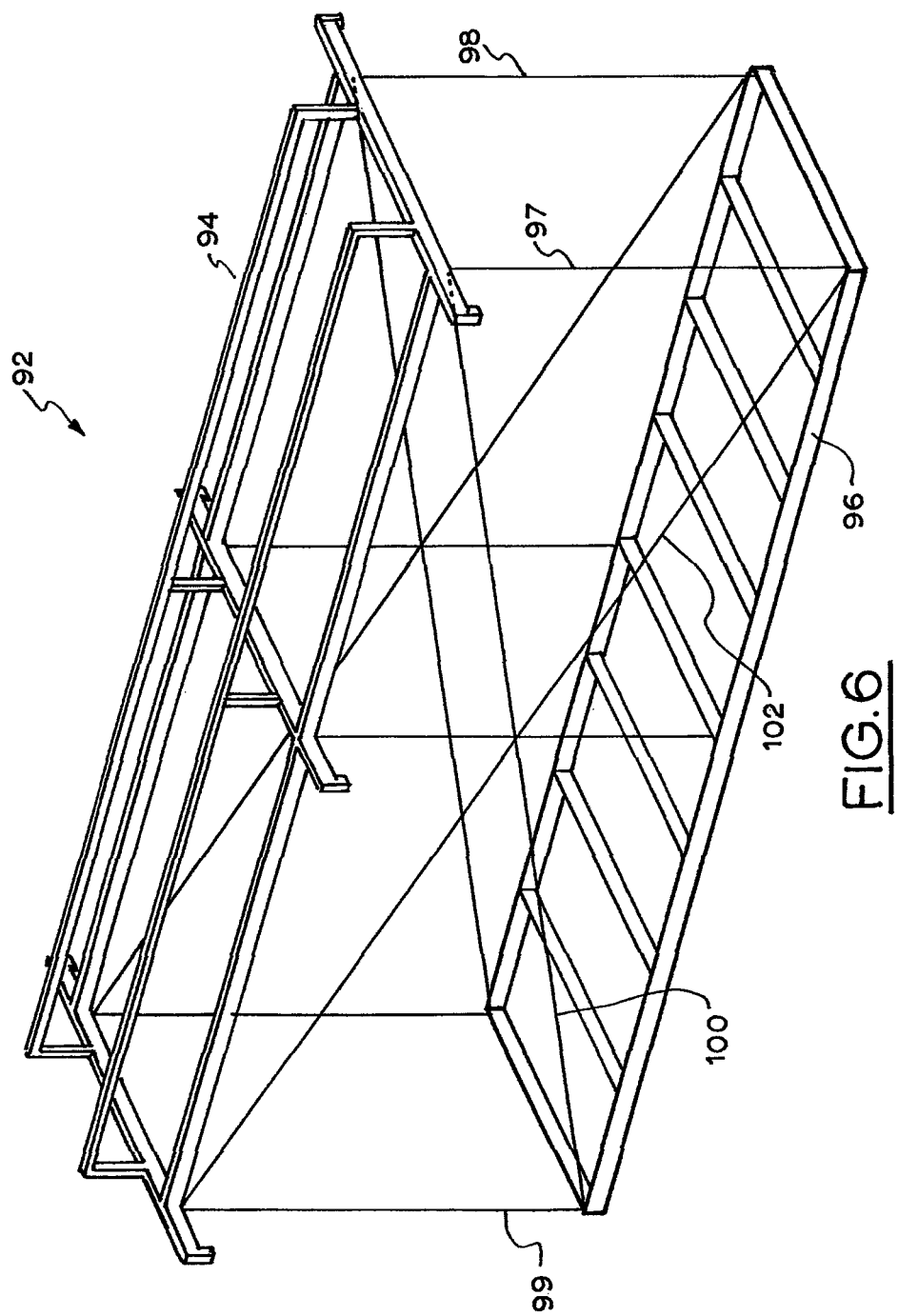
FIG. 6 shows a perspective view of another apparatus in accordance with an embodiment of the present invention in an expanded configuration.

FIG. 6 shows a further embodiment of an apparatus 92 in accordance with the present invention. The apparatus 92 includes an upper support 94 that is identical to the upper support 12 shown in FIG. 1 and the upper support 72 shown in FIG. 5. The apparatus also includes a lower support 96 that is identical to the lower support 74 shown in FIG. 5. The lower support 96 is connected to the upper support 94 by vertically extending cables or chains, some of which are numbered at 97, 98, 99. These chains or cables are equivalent to the chains or cables 86, 88, 90 shown in FIG. 5. The apparatus 92 also includes diagonally extending chains or cables 100, 102.

Figure 7:
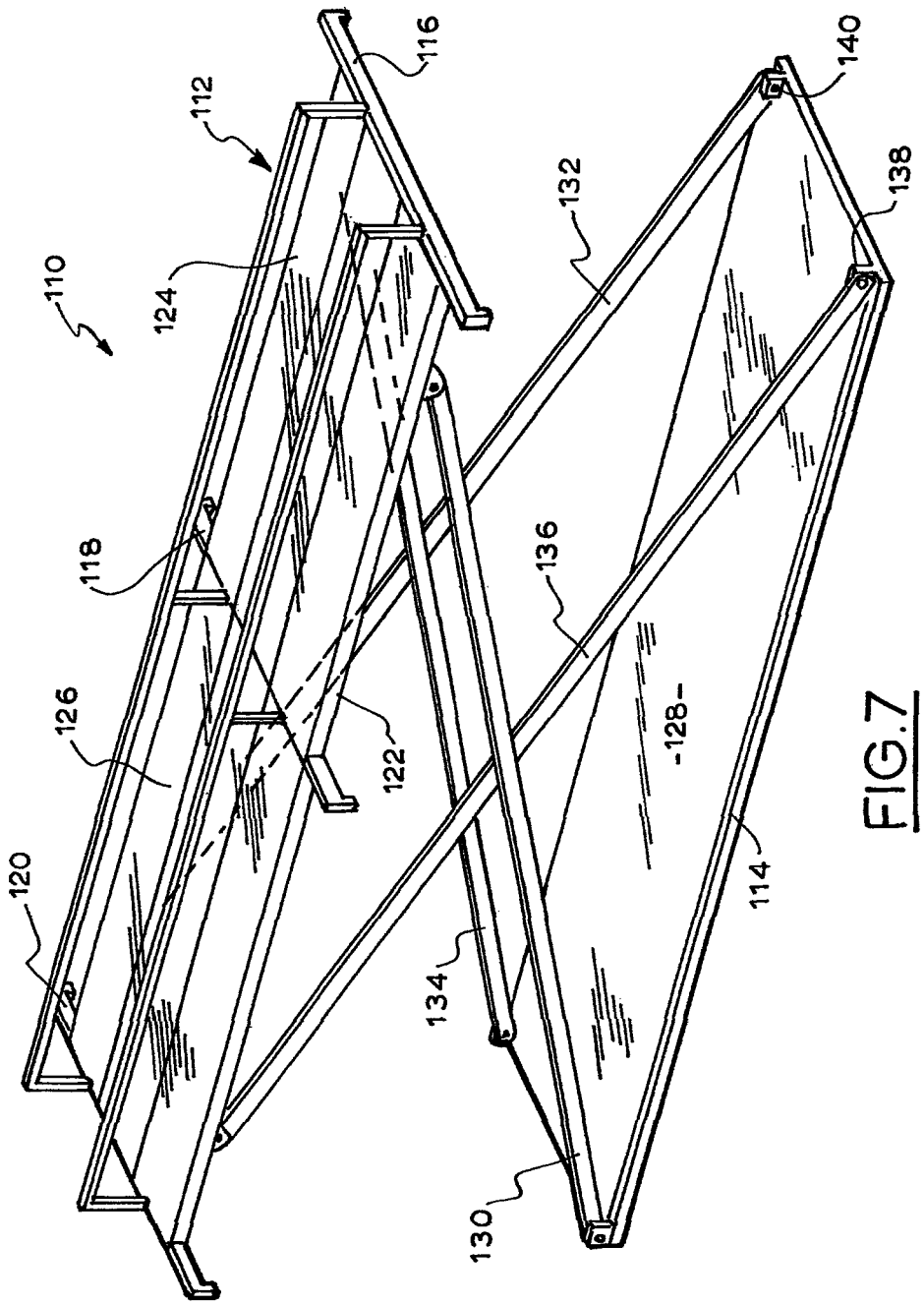
FIG. 7 shows a perspective view of another embodiment of an apparatus in accordance with the present invention in an expanded configuration.
Figure 8:
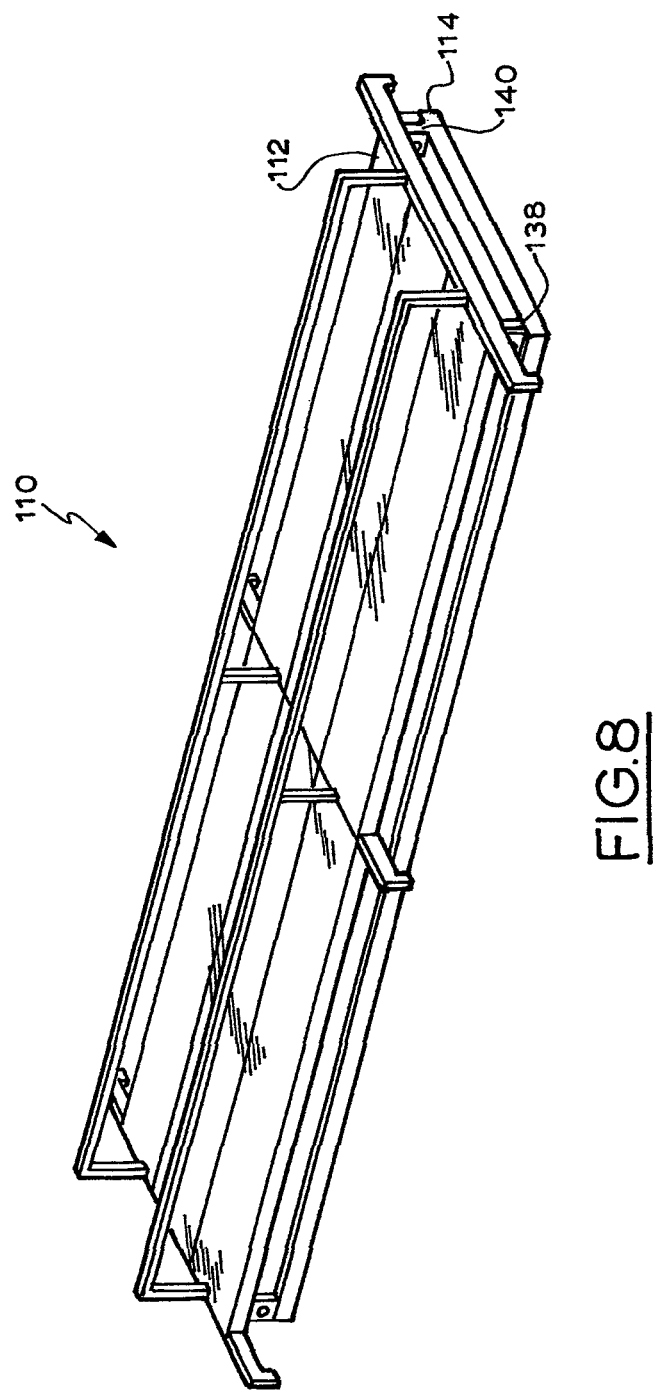
FIG. 8 shows a perspective view of the apparatus in FIG. 7 in the collapsed configuration. Again, the container has been omitted for clarity.

FIGS. 7 and 8 show views of another embodiment of the present invention. The apparatus 110 of the embodiment shown in FIGS. 7 and 8 comprises an upper support 112 and a lower support 114. The upper support 112 includes cross members, 118, 120. Longitudinal side members 122, 124 are connected to the cross members 116, 118, 120 to form a strong rectangular frame. A platform 126, which may be in the form of one or more boards or one or more plates, is mounted to the upper frame. Platform 126 allows an operator to walk along the upper support 112. The upper support 112 also includes the raised longitudinal members that are connected to the cross members and the downwardly extending projections from the ends of each cross member, as described with reference to the embodiment shown in FIG. 1.

The lower support 114 may include a frame as described with reference to the lower support 74 shown in FIGS. 4 and 5. A platform 128, which may be in the form of one or more boards or one or more plates, is positioned on the lower frame. The platform 128 provides an even support surface for the containers. In FIGS. 7 and 8, the containers have been removed for clarity. However, the containers of the embodiments shown in FIGS. 7 and 8 may be similar to the containers as shown with reference to FIG. 1.

As best shown in FIG. 7, the upper support 112 is connected to the lower support 114 by scissor linkages 130, 132. Scissor linkage 130 comprises beam 134 that is pivotally connected at its lower end to the lower support 114 and pivotally and slidably connected at its upper end to the upper support 112. Scissor linkage 130 also comprises beam 136 that is pivotally connected at its lower end to lower support 114 and pivotally and slidably connected at its upper end to the upper support 112. Beams 134, 136 may be pivotally connected to each other at a pivot point where they cross each other. Scissor linkage 132 is similarly configured.

The use of rigid beams, which are typically made from steel or other metal alloy, in the scissor linkages 130, 132 provides greater stability against lateral movement of the lower support 114 relative to the upper support 112 (when compared to use of cables or chains).

FIG. 8 shows the apparatus 110 in the collapsed configuration. As can be seen, brackets or ears 138, 140 that allow the lower ends of beam 136 to be pivotally connected to the lower support acts to space the upper support from the lower support when the apparatus 110 is in the collapsed configuration. The empty containers may neatly fit into that space when the apparatus is in the collapsed configuration.

Figure 9:
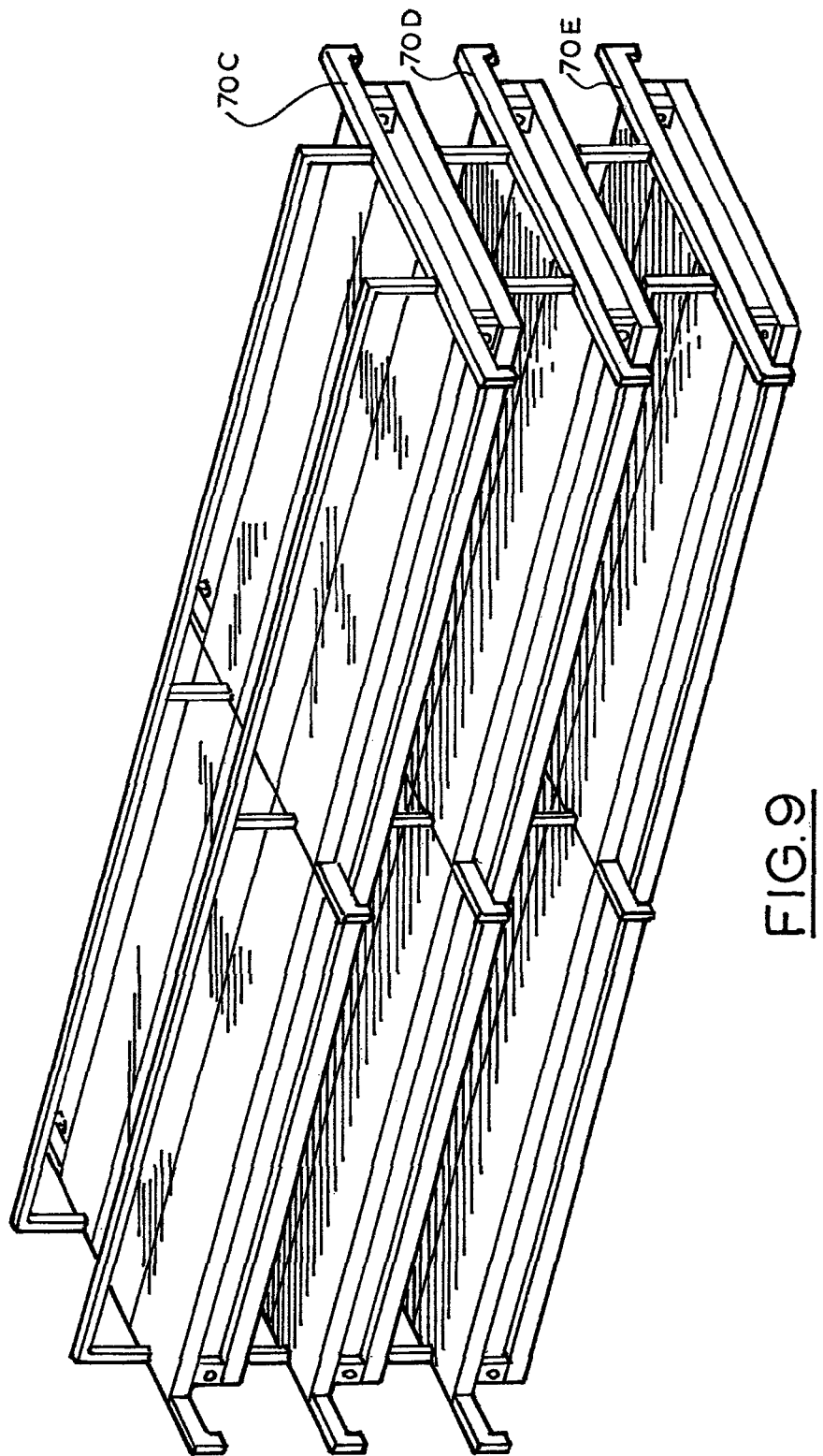
FIG. 9 shows a plurality of apparatus in accordance with an embodiment of the present invention in the collapsed configuration, with the plurality of apparatus being formed into a stack.

FIG. 9 shows three separate pieces of apparatus 70C, 70D and 70E that are essentially identical to the apparatus shown in FIGS. 4 and 5. Each of the apparatus 70C, 70D, 70E are in the collapsed configuration. The apparatus 70C, 70D, 70E are stacked one on top of each other for storage and transport purposes. In the embodiment shown in FIG. 9, the stacked apparatus may be placed on the back of a flatbed tray of a railway wagon or truck or truck trailer for transport. In this manner, the empty and collapsed apparatus can be transported from a mine to another location as part of a stack of collapsed apparatus loaded onto a railway wagon or truck or truck trailer. As the apparatus adopts a low profile when in the collapsed configuration, the stack of apparatus can fit onto the railway wagon or truck or truck trailer.

Figure 10:
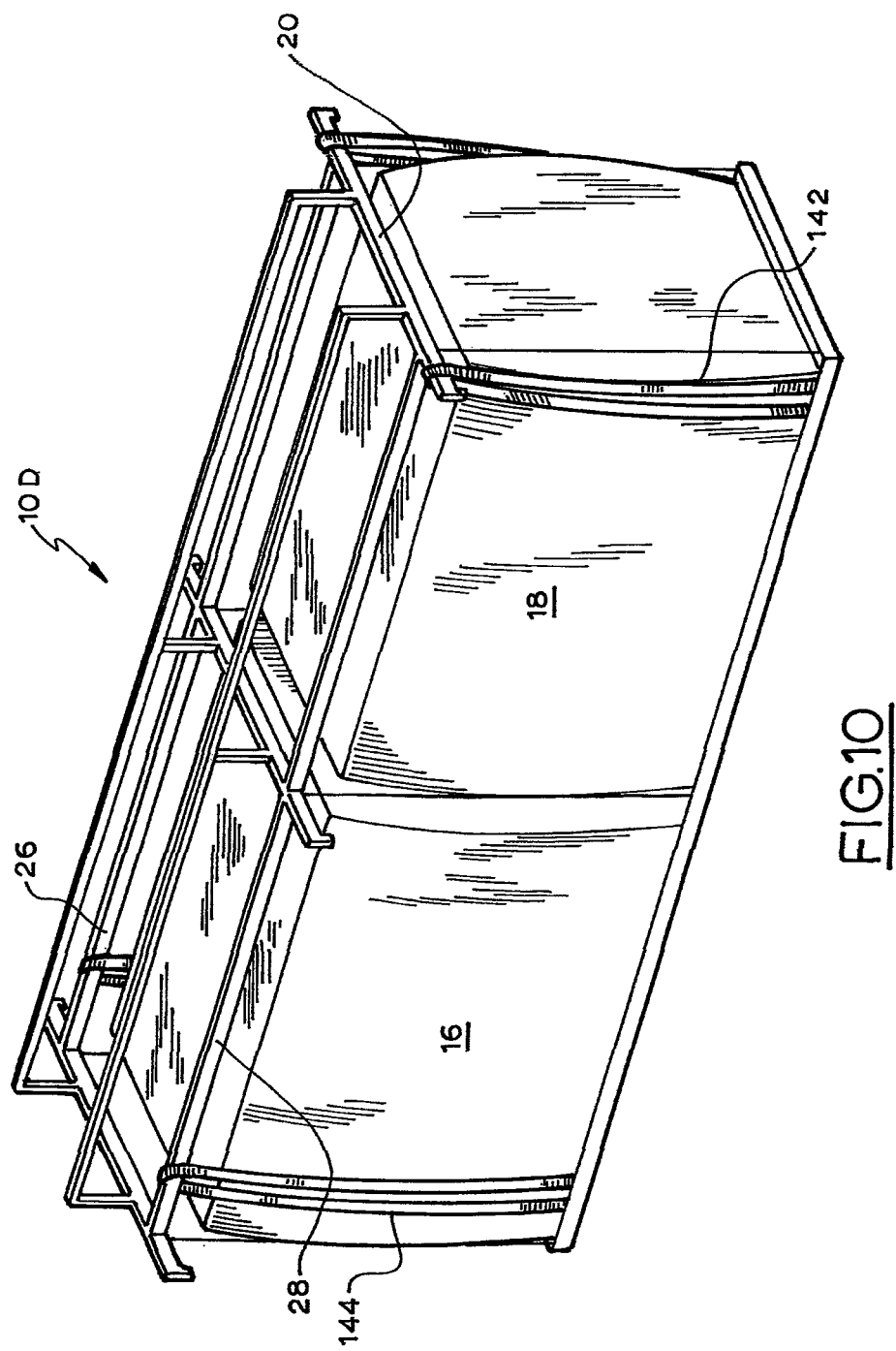
FIG. 10 shows a perspective view of an apparatus that is similar to that shown in FIG. 1, but with slings being used to connect the container to the support.
Figure 14:
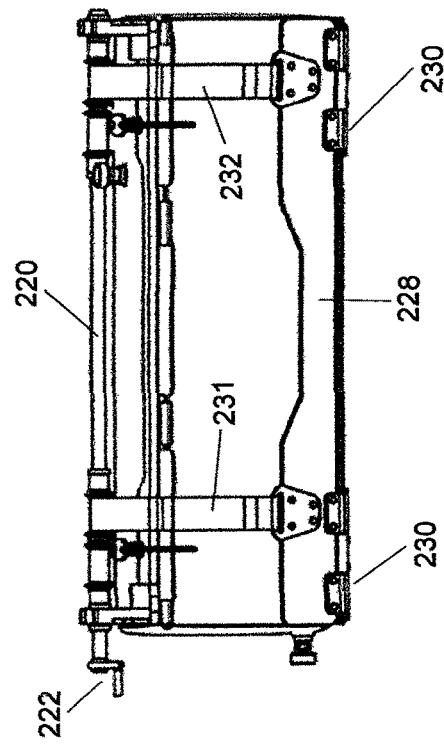
FIG. 14 shows a side view of the apparatus shown in FIG. 11.

FIG. 10 shows an apparatus 10D that is generally identical to the apparatus shown in FIG. 1. For brevity of description, features of the apparatus 10D will not be described in further detail. The apparatus 10D shown in FIG. 1 includes slings 142, 144 that are used to mount, connect or tether the containers to the upper support. The sling 142 extends around cross member 20, down along the side of container 18, under the container 18, up along the other side of the container 18 and around the other end of cross member 20. The sling 144 extends around longitudinal member 28, down along the side of container 16, under the container 16, up along the other side of container 16 and around the longitudinal member 26. Although only two slings are shown in FIG. 10, it will be appreciated that a greater number of slings may be used.

The embodiments shown in the attached drawings all include a lower support. In some embodiments, it may be possible to attach or mount the container or containers to the upper support and not require the lower support.

In one embodiment of use of the apparatus of the present invention, a railway wagon is filled with bulk commodity, such as iron ore or coal, at a mine. An apparatus in its collapsed configuration is then lifted and placed on top of the railway wagon. The bulk commodity sits below the apparatus. As the apparatus has a low profile or a low height in its collapsed configuration, it projects only a small distance above the top of the railway wagon. When the train pulling the railway wagon nears a port or other location where the bulk commodity is to be discharged from the railway wagon, the apparatus may be lifted off the railway wagon and the railway wagon emptied of bulk commodities. Alternatively, if the discharge arrangements for bulk commodities from the railway wagon allow the apparatus to remain on top of the railway wagon, it may not be necessary to remove the apparatus from the railway wagon.

Once the bulk commodities have been emptied from the railway wagon, if the apparatus has been removed, it is returned to the top of the railway wagon. In one embodiment, the containers are filled with liquid prior to returning the apparatus to the railway wagon. In other embodiments, the containers are filled with liquid whilst the apparatus is in position on the railway wagon. Of course, the apparatus moves to its expanded configuration when the containers are filled with liquid and the lower support and/or the containers are contained within the volume defined by the railway wagon.

The train, which is now carrying a load of liquid (e.g. fuel) rather than being an empty train, is then returned to the mine site. At the mine site, the containers are emptied. This may entail removing the apparatus from the railway wagons and subsequently emptying the fuel in the containers into fuel tanks at the mine site. Alternatively, the containers may be emptied whilst still in the railway wagon and the emptied containers and apparatus then removed from the railway wagons. Once the apparatus has been removed from the railway wagons, the railway wagons may be filled with bulk commodity and the empty apparatus in the collapsed configuration may subsequently be placed on top of the railway wagons to repeat the cycle.

In other embodiments, rather than taking the empty apparatus and containers back on top of the bulk commodity-carrying railway wagons, trucks or truck trailers, the apparatus may be transported by other trucks or truck trailers or trains that are leaving the mine site for other locations. In this embodiment, the trucks or truck trailers or trains leaving the mine site that would otherwise be empty have a back load in the form of apparatus in accordance with the present invention in their collapsed configuration.

FIGS. 11 to 22 show various views of an apparatus in accordance with another embodiment of the present invention. The apparatus 200 shown in these figures comprises an upper support 202 and a lower support 204. The apparatus 200 also includes a container, in the form of a flexible bladder 206.

FIGS. 11 to 15 show the apparatus 200 in an expanded configuration. As can be seen from these drawings, the upper support 202 is in the form of an upper frame that comprises a first longitudinal side member 208, a second longitudinal side member 210 and cross members 212, 214 that are welded to longitudinal side members 208, 210 to form the frame. The cross member 212 is of an arcuate shape and has a central region 216 that is positioned higher than the ends thereof. Crossmember 214 is essentially identical. The central region 216 includes an opening 218 in which a rotatable shaft 220 is mounted in bearings. Shaft 220 has its other end similarly mounted in the central region of crossmember 214. The rotatable shaft 220 is provided with a handle 222 that enables the rotatable shaft to be rotated by a user.

The lower support 204 comprises a central plate 224 having a first side member 226 hingedly connected thereto along the first side of the central plate 224 and a second side member 228 hingedly connected thereto along the second side of the central plate 224. The first side member 226 and second side member 228 are in the form of plates. In the embodiment shown in FIGS. 11 to 22, hinges 230 are used to connect the side plates to the central plate. In other embodiments, piano hinges may be used. In other embodiments, the side plates may be connected to the central plate by a flexible web that allows hinged movement therebetween. In this embodiment, the lower support may be made from a rigid plastics material, for example.

Figure 13:
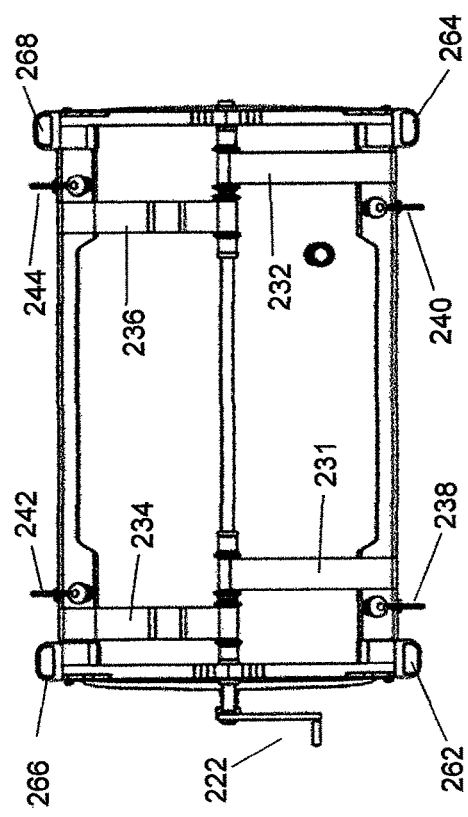
FIG. 13 shows a plan view of the apparatus shown in FIG. 11.
Figure 15:
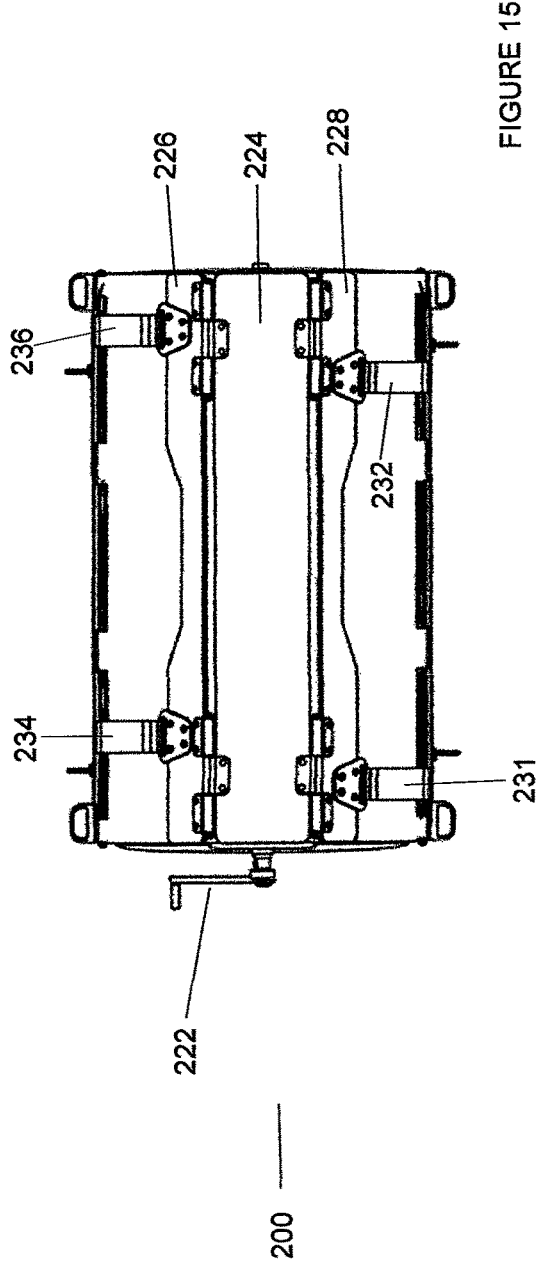
FIG. 15 shows an underneath view of the apparatus shown in FIG. 11.

The apparatus 200 is also provided with 4 straps 231, 232, 234, 236 (best shown in FIGS. 13 and 15). Each strap is connected at an upper end thereof to the rotatable shaft 220. The other end of straps 231, 232 connected to lower side plate 228. The other end of straps 234, 236 are connected to lower side plate 226. The length of the straps 231, 232, 234, 236 is such that when the bladder 206 is fully extended, the straps are not sufficiently long to enable the side plates 226, 228 to lay flat and co-planar with central plate 224. As a result, the side plates 226, 228 hinge upwardly and outwardly relative to the central plate 224, as shown in FIGS. 11 and 12. Further, a portion of the straps extend along the sides of the bladder 206. In this manner, the lower region of the bladder 206 is supported by the central plate 224, the first side member 226 and the second side member 228, whilst the portions of the straps that extend along the sides of the bladder also provide a degree of support to the sides of the bladder 206.

The upper support 202 is also provided with a plurality of clamps 238, 240, 242, 244. Clamp 238 comprises a cranked arm 246 having a hook 248 at an outer end thereof. An inner end 250 of cranked arm 246 is biased upwardly by spring 252, which biases the outer part of cranked arm 246 downwardly. The other clamps 240, 242, 244 are essentially identical.

The upper support 202 is also provided with lifting eyes 254, 256, 258, 260, which enable a lifting apparatus, such as a crane, gantry or forklift, to be attached to the upper frame to thereby lift and/or lower the apparatus 200. The upper support 202 is also provided with open ears 262, 264, 266, 268 that enable the apparatus 200 to be located on or mounted on a stand, as will be described hereunder with reference to FIGS. 21 and 22.

The bladder 206 also includes a first opening 270 that allows the bladder to be filled and a second opening 272 that allows the bladder to be emptied, or in which the second opening 272 is used to fill and empty the bladder and first opening 270 serves a breather function. First opening 270 is located in a roof of the bladder 206 and second opening 272 is located in a lower region of an end of the bladder 206.

FIGS. 11 to 15 show the apparatus 200 in the expanded configuration in which the bladder 206 can be filled with liquid, such as fuel, or other material. As previously mentioned, the straps are arranged such that when the bladder is in this configuration, the side plates 226, 228 of the lower support hinge upwardly and outwardly relative to the central plate 224, to thereby support the lower region of the bladder and to provide additional impact on abrasion protection to the lower region of the bladder 206. Additionally, the arrangement of the side plates 226, 228 in being hingedly connected to the central plate 224 in order to form the lower support means that the lower support can more easily fit into open topped railway wagons or open topped trucks or truck trailers. As the lower support shown in FIGS. 11 to 22 allows the side plates to hinge relative to the central plate, the lower support can present a narrower profile than if the lower support was simply made as a fixed frame or a single plate. This enables the lower support to fit into a wider variety of railway wagons or trucks or truck trailers than would otherwise be possible.

Figure 18:
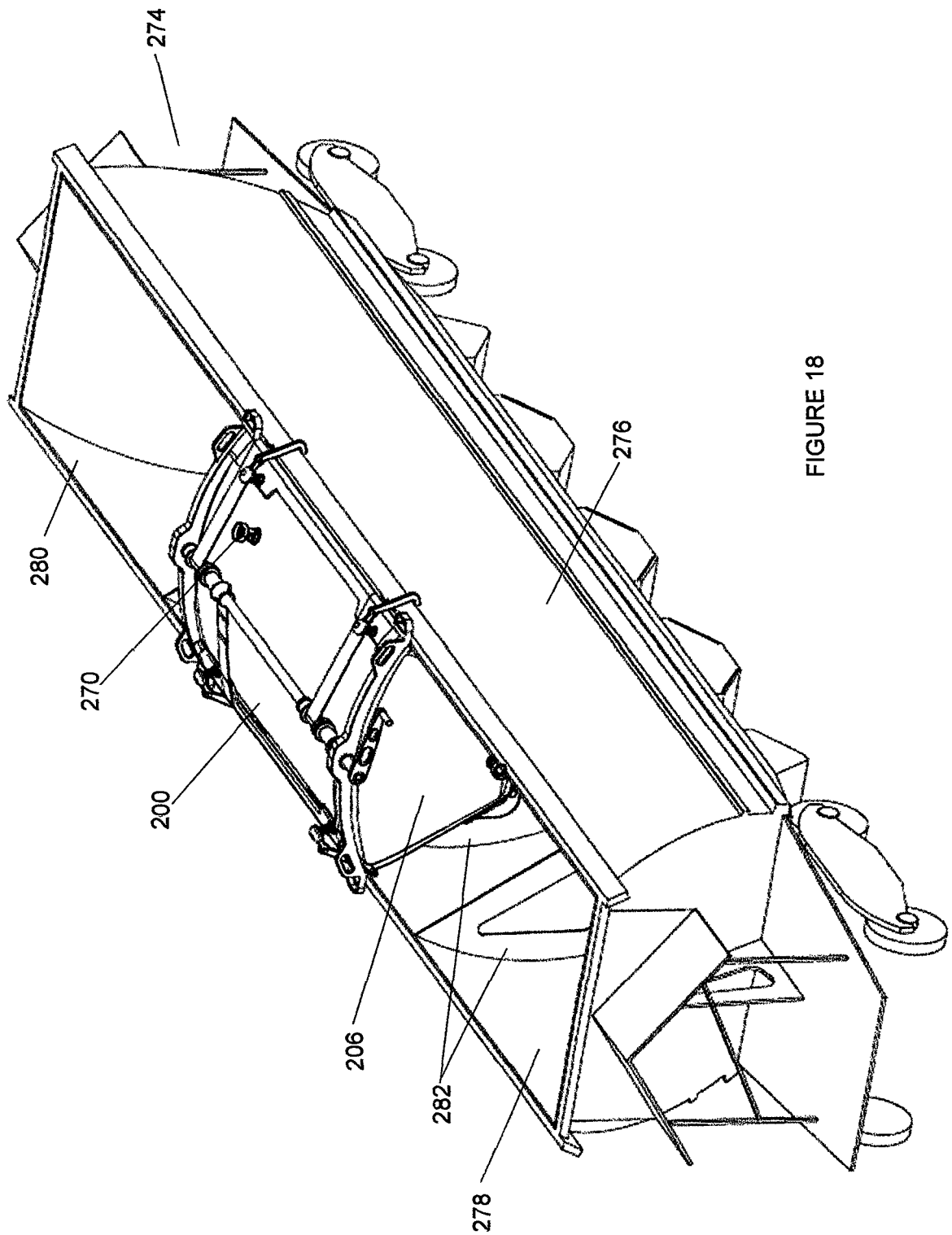
FIG. 18 shows the apparatus of FIG. 11 in the expanded configuration being positioned on and inside an open top railway wagon.
Figure 19:
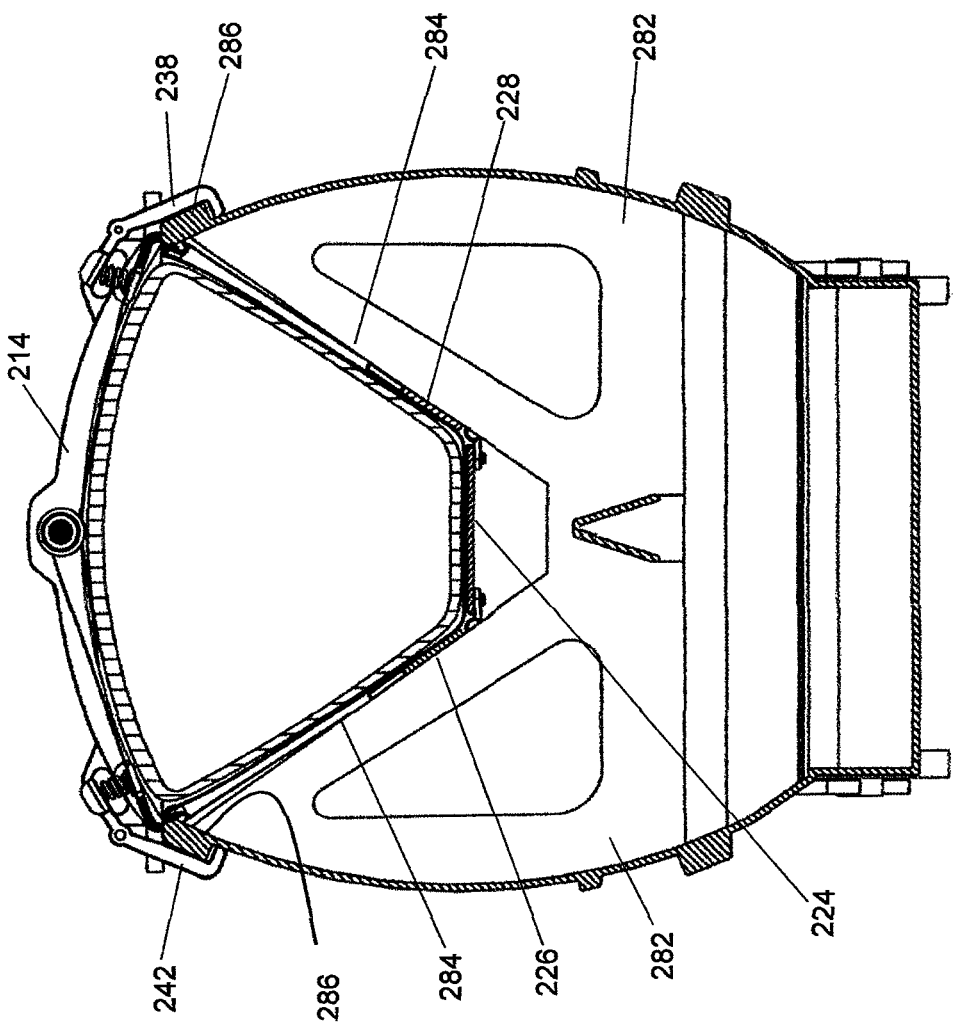
FIG. 19 shows an end cross-sectional view of FIG. 18, showing the apparatus in the expanded configuration being located on and in the railway wagon.

FIGS. 18 and 19 show the apparatus 200 positioned on and in a railway wagon 274. The railway wagon 274 has side walls 276, 278 and an open top 280 that is at least partly defined by the upper edges of the side walls 276, 278. In order to increase the strength of the railway wagon, reinforcing members 282 (best shown in FIG. 19) are welded to the inner surfaces of the railway wagon 274. A plurality of longitudinally spaced reinforcing members 282 are welded to the inside of the railway wagon. The reinforcing members 282 have inner edges 284 that slope inwardly and downwardly towards the floor of the railway wagon. As can be seen from FIG. 19, the side plates 226, 228 of the lower support rest on and are supported by the edges 284 of the reinforcing members 282. In this manner, much of the weight of the filled bladder and the apparatus 200 is borne by the reinforcing members 282 and, via the reinforcing members by the floor and side walls of the railway wagon (although some of the weight will also be borne by the upper edges of the side walls of the wagon). It will be appreciated that the reinforcing members are strong members that can easily carry the weight of the apparatus, including the filled bladder. As can also be seen from FIG. 19, the clamps 238, 242 are positioned so that the hooks at their outer ends extend over the upper edges 286 of the railway wagon 274. In this manner, the clamps assist in holding the apparatus 200 in position relative to the railway wagon 274.

Figure 17:
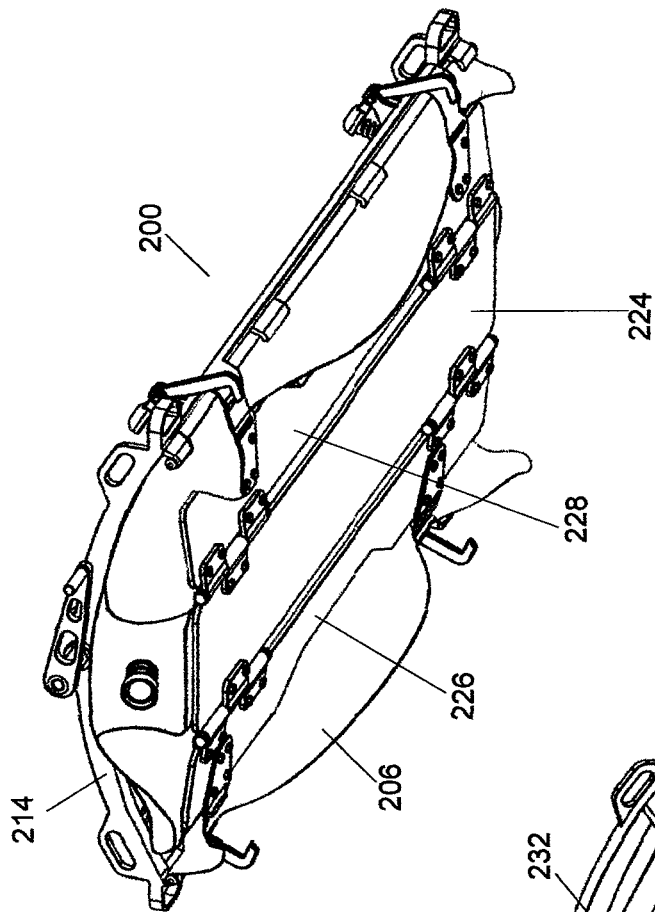
FIG. 17 shows a perspective view from below of the apparatus shown in FIG. 16.
Figure 16:
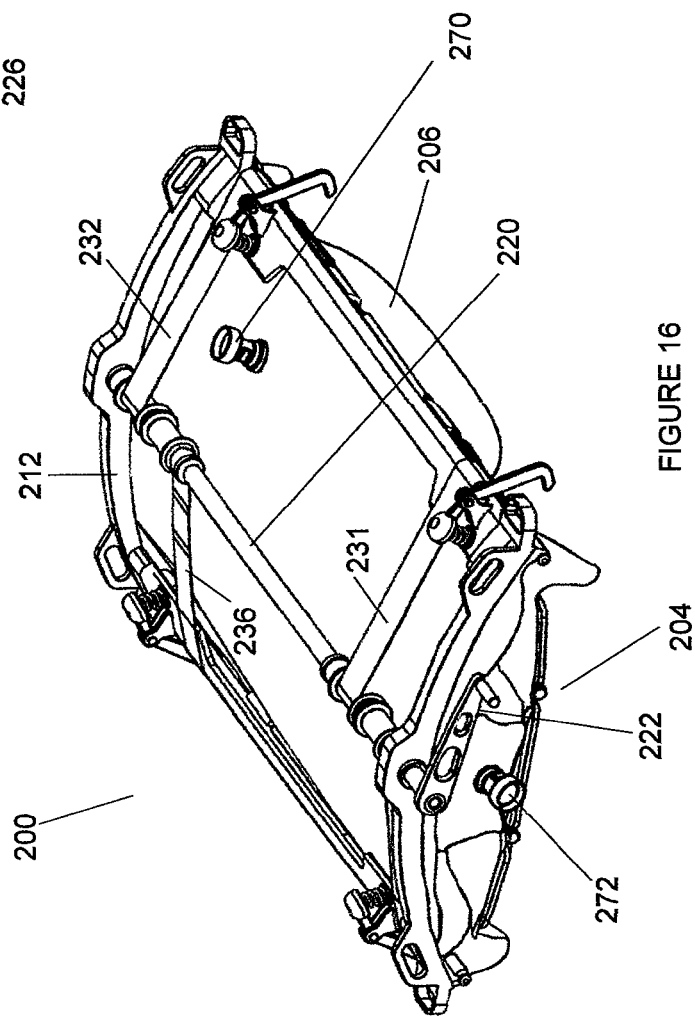
FIG. 16 shows a perspective view from above of the apparatus shown in FIG. 11, with FIG. 16 showing the apparatus in the collapsed configuration.

FIGS. 16 and 17 show the apparatus 200 in the collapsed configuration. In order to collapse the apparatus 200, the bladder 206 is emptied and the handle 222 is turned to rotate the rotatable shaft 220 which, in turn, causes the straps 231, 232, 234, 236 to roll up along the rotatable shaft 220. This raises the lower support 204 towards the upper support 202. Rotation of the handle 222 continues until the empty bladder 206 is sandwiched between the lower support 204 and the upper support 202. There may be some bagging of the empty bladder 206 in this configuration, as shown in FIGS. 16 and 17. In the collapsed configuration, the apparatus 200 has a low profile. Further, the side plates 226, 228 of the lower support 204 come more into alignment with the central plate 224 of the lower support, which also assists in lowering the height or profile of the apparatus 200 when in the collapsed configuration.

Figure 20:
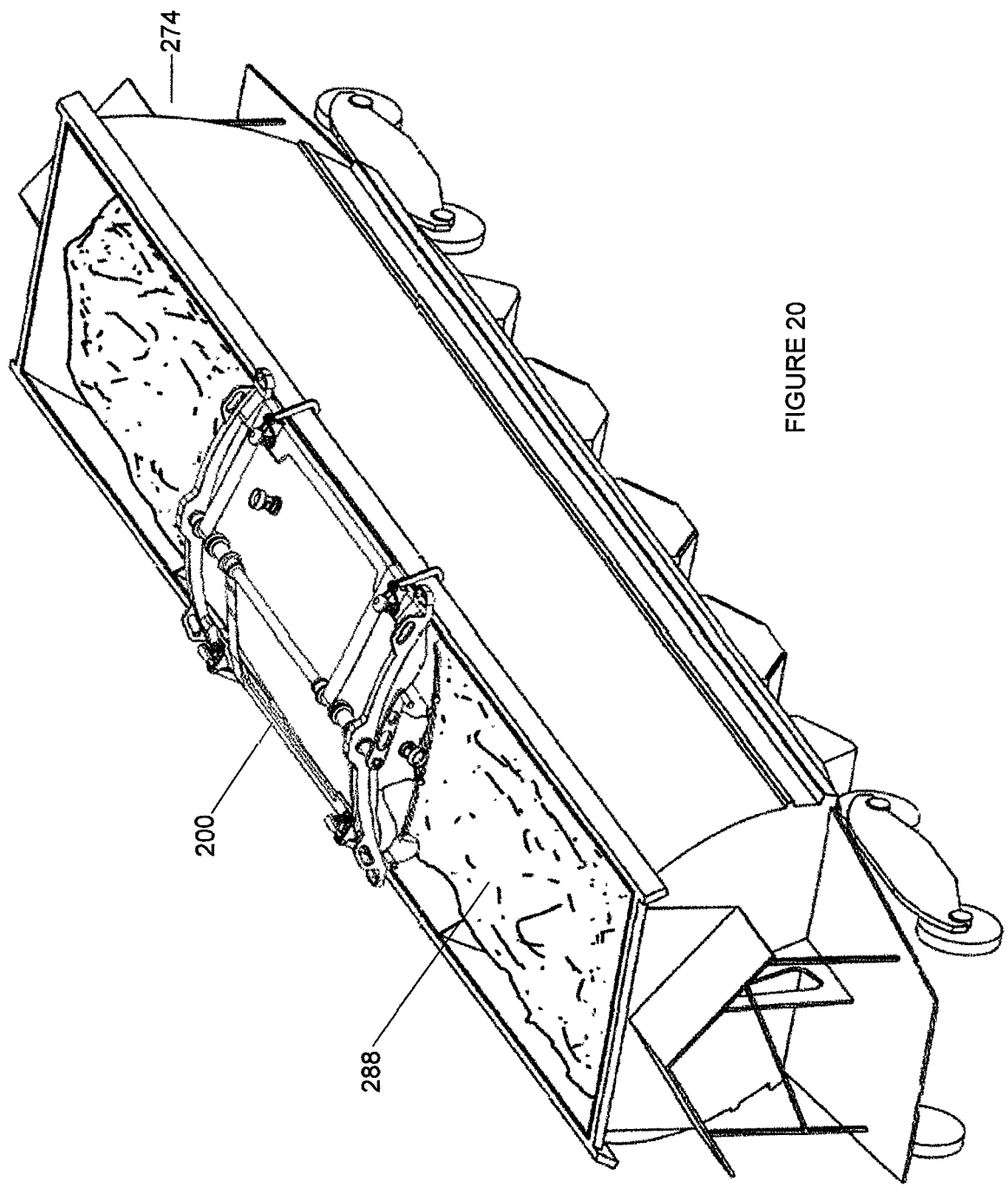
FIG. 20 shows a perspective view from above of the apparatus shown in FIG. 16 in the collapsed configuration being transported on a railway wagon filled with coal or other minerals.

The apparatus 200 in the collapsed configuration is shown in FIG. 20 positioned on a railway wagon 274. The railway wagon 274 in FIG. 20 is filled with coal 288 or other minerals or commodities. The apparatus 200 has its weight supported by the upper edges of the sidewalls of the railway wagon 274. Depending upon how high the coal level is in the railway wagon 274, the lower support 204 of the apparatus 200 may also rest on the coal and therefore some of the weight of the apparatus 200 may also be borne by the coal.

Figure 21:
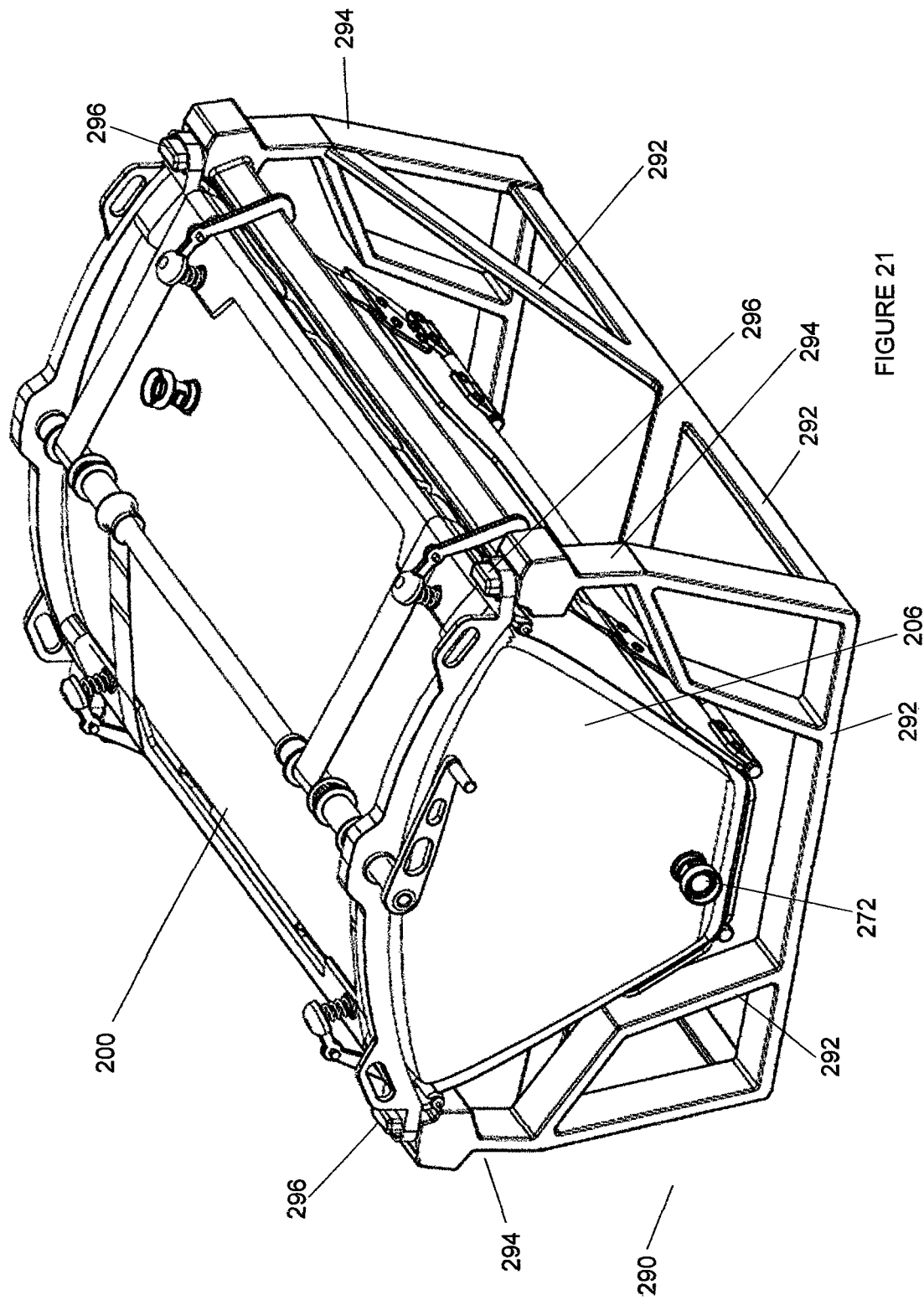
FIG. 21 shows the apparatus shown in FIG. 11 being positioned on a stand.
Figure 22:
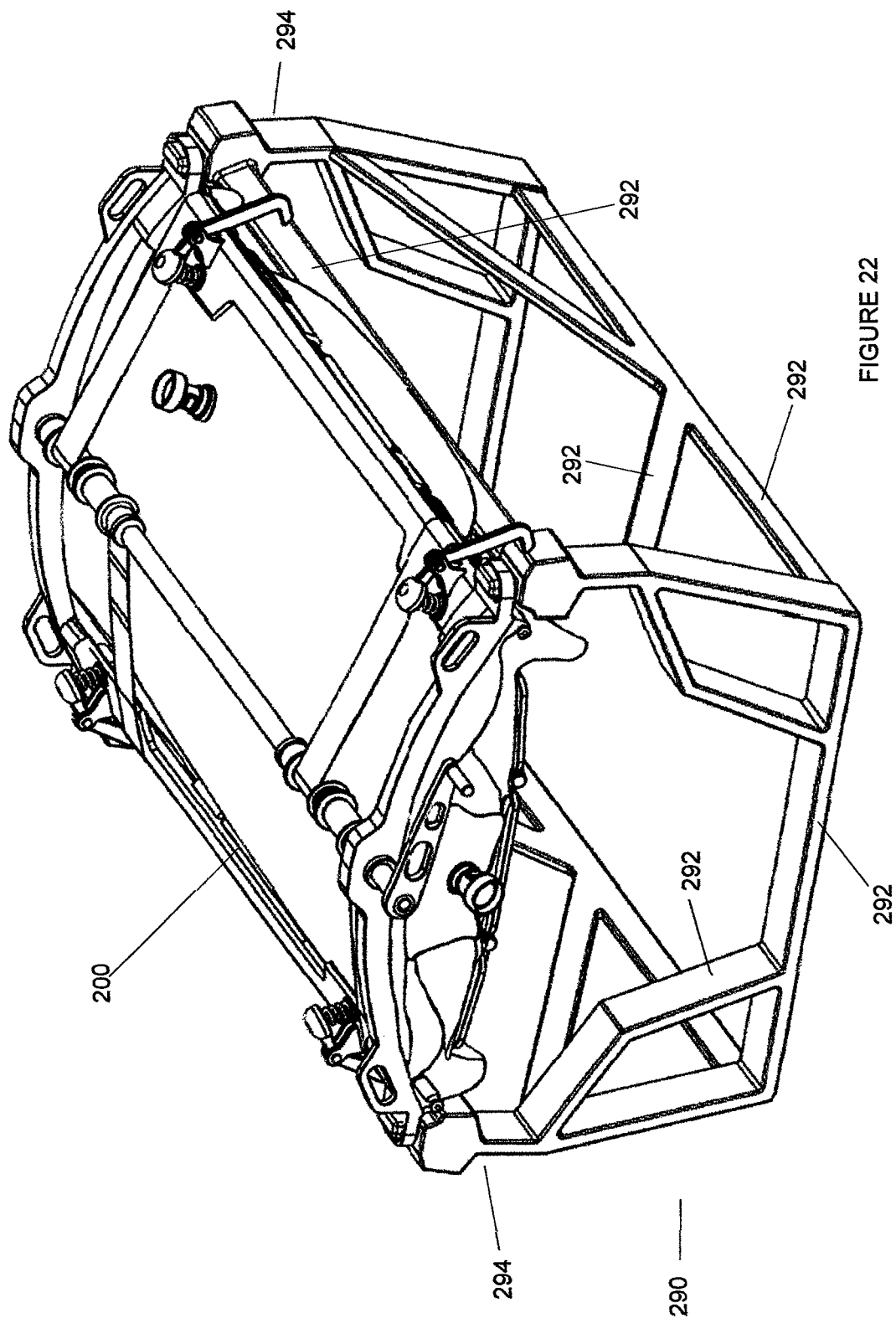
FIG. 22 shows the apparatus shown in FIG. 16 in the collapsed configuration being supported on the stand as shown in FIG. 21.

FIGS. 21 and 22 show the apparatus 200 being carried by a stand 290. The stand 290 is in the form of a three-dimensional frame having frame members 292 welded to each other. Corner members 294 of the stand 290 have upstanding projections 296 at their upper ends. These projections can be received in open ears 262, 264, 266, 268 of the upper support 202 of the apparatus 200 to thereby enable the apparatus 200 to be mounted onto the stand 290. The clamps of the apparatus 200 may engage with upper horizontal frame members of the stand 290 when the apparatus 200 is mounted to the stand 290.

FIG. 21 shows the stand 290 supporting the apparatus 200 having a full bladder 206, with the apparatus 200 being in the expanded configuration. Fuel may be emptied from the bladder 206 through the opening 272 to thereby empty fuel from the bladder. As can be seen from FIG. 21, the stand 290 has a frame that is shaped to accommodate the apparatus 200 when in the expanded configuration. When the bladder 206 has been emptied, the handle 222 may be rotated to raise the lower support and compress the bladder and to bring the apparatus 200 into the collapsed configuration, as shown in FIG. 22. The apparatus 200 may then be attached to a crane or other lifting apparatus, which will disengage the clamps and enable the apparatus 200 to be lifted off and moved away from the stand 290.

Although specific embodiment of the present invention has been described with reference to transporting fuel, it will be appreciated that other liquids and other flowable materials may be transported in the containers. For example, water that may be required for the mine site or mining operations may be transported.

In preferred embodiments of the present invention, the containers are ideally self bunded or double skinned and meet all required standards, such as Australian standards for use in Australia. The overall weight of the full containers should not exceed the weight of the incoming mined product or exceed the load limits of the rail line or roads concerned. The weight of the empty containers is desirably minimised so as to reduce the potential for such empty containers being carried back to the filling location to impact on the quantity of mined product being transported to the port or other location.

The apparatus will need to be lifted onto or off the railway wagon or truck or truck trailer by a lifting apparatus, such as a gantry, forklift or a crane. A movable gantry, crane or forklift that moves along at the same speed as the train may be used to lift the apparatus off or onto the train at the mine site, port or other location.

In preferred embodiments, the apparatus is desirably stable whilst being transported on or in the railway wagon to prevent or reduce potential for rollover of the railway wagon. The full container desirably sits wholly or partly within the empty railway wagon when returning to the mine site whereas the empty container should preferably sit on top of the full railway wagon when returning empty to the port for filling. This minimises the impact on the amount of mined product that can be carried by the railway wagon to port. The same would apply to a truck or truck trailer situation.

In preferred embodiments, the height of the overall railway wagon and apparatus combined is limited to the lowest overhead clearance on the railway line or by rail operator requirements, whichever is lower. The same considerations apply to the width of the apparatus. The containers could be designed so that they could feed into existing mine sites static or mobile fuel storage depots. In one example, the apparatus of the present invention can be placed on top of existing fuel storage containers located permanently at the mine site and be gravity or pump fed to transfer the fuel to the existing fuel storage containers.

The apparatus of the present invention, in preferred embodiments could also be designed so that the container can be lowered and raised to vary its carrying capacity. The full container preferably sits inside an empty railway wagon so that the railway wagon provides greater protection to the full container in the event of a rail accident. This also lowers the centre of gravity of the combination of the apparatus and railway wagon, which is likely to reduce the sway of the railway wagon and make the railway wagon more stable when moving or being shunted. The containers are desirably able to be filled from existing fuel loading depots at ports so that they can use existing fuel terminal storage and loading infrastructure at ports.

The present invention provides the opportunity to lower fuel transport costs by transporting fuel on what would otherwise be empty trains or empty trucks or truck trailers returning to the mine site to be filled with mined product. In other embodiments, the empty apparatus may be returned to filling locations as a back load on what would otherwise be empty trains or trucks or truck trailers. In either case, transport costs are reduced as the requirement to send separate trains or trucks or truck trailers with specific fuel carrying capabilities to the mines is reduced or removed.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An apparatus for storing or transporting flowable materials or other materials, the apparatus comprising a container, an upper support and a lower support, the upper support adapted to sit on or be mounted across an upper part of an open top railway wagon or open top truck or truck trailer used for transporting bulk commodities, the upper support comprising an upper support plate or an upper support frame, the lower support comprising a lower support plate or a lower support frame or a lower support platform, the lower support having a smaller width than a width of the upper support, a plurality of movable members extending between the upper support and the lower support and connecting the upper support to the lower support;

wherein the apparatus is movable between an expanded configuration in which the container is expandable into a lower part of the open top railway wagon or open top truck or truck trailer used for transporting bulk commodities, and a collapsed configuration in which the container is collapsible to the lower support or upper support;

wherein the weight of the upper support and container is borne by the upper part of the railway wagon or truck or truck trailer when the container is in the collapsed configuration and the apparatus is positioned on an empty railway wagon or truck or truck trailer;

wherein the lower support comprises a central member or central plate, a first member or first plate hingedly connected to a first side of the central member or central plate and a second member or second plate hingedly connected to a second side of the central member or central plate; and wherein the plurality of movable members have a maximum length that is sufficiently short to cause the first member or first plate and the second member or second plate to hinge upwardly when the apparatus is in the fully expanded configuration such that the first member or first plate and second member or second plate of the lower support will extend upwardly and outwardly relative to the central member or central plate of the lower support when the apparatus is in the fully expanded configuration and the sides of the container are at least partly supported by the first member or first plate and the second member or second plate and the portions of the movable members that extend along the sides of the container, when in the expanded configuration.

2. The apparatus as claimed in claim 1 wherein the plurality of movable members comprise a plurality of straps, or a plurality of cables, or a plurality of chains, or a plurality of wires.

3. An apparatus as claimed in claim 1 wherein the upper support comprises an upper frame having longitudinal members connected by crossmembers and a rotatable shaft, and the plurality of movable members comprise a plurality of straps, cables, chains or wires, wherein the plurality of straps, cables, chains or wires are each mounted at one end to the rotatable shaft and mounted at another end to the lower support.

4. The apparatus as claimed in claim 3 wherein the rotatable shaft is provided with a handle or drive motor to enable the rotatable shaft to be rotated, or the rotatable shaft is engageable with a drive shaft of a drive motor to cause the rotatable shaft to rotate.

5. The apparatus as claimed in claim 1 wherein the upper support comprises a first longitudinal side member, a second longitudinal side member, a first crossmember extending between and connecting the first longitudinal side member to the second longitudinal side member, a second crossmember extending between and connecting the first longitudinal side member to the second longitudinal side member, and a rotatable shaft extending between and rotatably mounted to the first crossmember and the second crossmember.

6. The apparatus as claimed in claim 5 wherein the rotatable shaft is mounted in bearings mounted in the first crossmember and the second crossmember.

7. The apparatus as claimed in claim 5 wherein the first crossmember and the second crossmember have a central region that is higher than the end regions and the rotatable shaft is mounted to the central region of the first crossmember and the second crossmember.

8. The apparatus as claimed in claim 1 wherein the upper support comprises one or more lifting points to enable a lifting apparatus, such as a crane, gantry or forklift, to be connected to the upper support and enable the apparatus to be lifted and lowered.

9. The apparatus as claimed in claim 1 wherein the upper support comprises one or more clamps that engage with the railway wagon or truck or truck trailer when the apparatus is positioned on the railway wagon or truck or truck trailer.

10. The apparatus as claimed in claim 9 wherein the one or more clamps are biased downwardly and the one or more clamps are arranged such that when a lifting apparatus is used to lift or lower the apparatus, the lifting apparatus moves the one or more clamps to a disengaged position and when the apparatus is positioned on the railway wagon or truck or truck trailer and when the lifting apparatus removed from the apparatus, the one or more clamps move to an engaged position.

11. The apparatus as claimed in claim 9 wherein the one or more clamps extend over the outer side walls of the railway wagon or truck or truck trailer and have a clamping region or hooked region that is positioned under an edge of the sidewall of the railway wagon or truck or truck trailer when the apparatus is positioned on the railway wagon or truck or truck trailer.

12. The apparatus as claimed in claim 1 wherein the upper support is provided with a plurality of eyes or eyelets or a plurality of ears for receiving associated projections on a stand to thereby position and support the apparatus on the stand.

13. An apparatus for storing or transporting flowable materials or other materials, the apparatus comprising a container, an upper support and a lower support, the upper support adapted to sit on or be mounted across an upper part of an open top railway wagon or open top truck or truck trailer used for transporting bulk commodities, the upper support comprising an upper support plate or an upper support frame, the lower support comprising a lower support plate or a lower support frame or a lower support platform, the lower support having a smaller width than a width of the upper support, a plurality of movable members extending between the upper support and the lower support and connecting the upper support to the lower support;

wherein the apparatus is movable between an expanded configuration in which the container is expandable into a lower part of the open top railway wagon or open top truck or truck trailer used for transporting bulk commodities, and a collapsed configuration in which the container is collapsible to the lower support or upper support;

wherein the weight of the upper support and container is borne by the upper part of the railway wagon or truck or truck trailer when the container is in the collapsed configuration and the apparatus is positioned on an empty railway wagon or truck or truck trailer;

wherein the upper support comprises a first longitudinal side member, a second longitudinal side member, a first crossmember extending between and connecting the first longitudinal side member to the second longitudinal side member, a second crossmember extending between and connecting the first longitudinal side member to the second longitudinal side member, and a rotatable shaft extending between and rotatably mounted to the first crossmember and the second crossmember.

14. The apparatus as claimed in claim 13 wherein the rotatable shaft is mounted in bearings mounted in the first crossmember and the second crossmember.

15. The apparatus as claimed in claim 13 wherein the first crossmember and the second crossmember have a central region that is higher than the end regions and the rotatable shaft is mounted to the central region of the first crossmember and the second crossmember.

* * * * *